US011989813B2

(12) United States Patent
Smith et al.

(10) Patent No.: US 11,989,813 B2
(45) Date of Patent: May 21, 2024

(54) TALKING HEAD DIGITAL IDENTITY AUTHENTICATION ON A DISTRIBUTED NETWORK

(71) Applicant: AvaWorks Incorporated, Santa Monica, CA (US)

(72) Inventors: Roberta Jean Smith, Santa Monica, CA (US); Nicolas Antczak, Sherman Oaks, CA (US)

(73) Assignee: AvaWorks Incorporated, Santa Monica, CA (US)

( * ) Notice: Subject to any disclaimer, the term of this patent is extended or adjusted under 35 U.S.C. 154(b) by 0 days.

(21) Appl. No.: 18/108,612

(22) Filed: Feb. 11, 2023

(65) Prior Publication Data
US 2023/0260187 A1    Aug. 17, 2023

Related U.S. Application Data

(60) Provisional application No. 63/309,484, filed on Feb. 11, 2022.

(51) Int. Cl.
*G06T 13/40* (2011.01)
(52) U.S. Cl.
CPC .................................. *G06T 13/40* (2013.01)
(58) Field of Classification Search
None
See application file for complete search history.

(56) References Cited

U.S. PATENT DOCUMENTS

2010/0085363 A1* 4/2010 Smith .................... H04N 5/262
345/473
2021/0110493 A1* 4/2021 Yang ..................... H04L 9/3239

FOREIGN PATENT DOCUMENTS

WO    WO-2022049053 A1 *  3/2022

* cited by examiner

*Primary Examiner* — Peter Hoang
(74) *Attorney, Agent, or Firm* — Harvey Lunenfeld

(57) ABSTRACT

A talking head digital identity immutable dual authentication method for use over a distributed network, comprising: downloading talking head and talking head show files from nodes of a distributed network; downloading hash values of a talking head and talking head show from a blockchain; sending a hash of a publisher's identification from the blockchain to a name lookup service; retrieving and confirming the identity of the publisher from the name look up service; recalculating hash values of the talking head and talking head show; comparing the recalculated hash values of the talking head and talking head show with the hash values of the talking head and talking head show retrieved from the blockchain; starting playback of the talking head show if the hash values received from the blockchain match the recalculated hash values of the talking head and the talking head show retrieved from the nodes of the distributed network.

16 Claims, 35 Drawing Sheets

- The block is hashed with a hash number having leading zeros. The number of zeros determines the difficulty of mining.
- Nonce is a random number that is used only once.
- Miners select as many Nonces as possible, as fast as possible.
- Each Nonce is hashed, and its hash is compared to the hash of the block.
- The miner that finds the Nonce, which generates a hash closest to hash of the block without going over is the winner and gets paid in blockchain's cryptocurrency.
- The hash of the winning block is then added to the block.
- The block is hashed again. This hash is the block's final hash.
- The block is then added to the blockchain.
- If two miners find the winning nonce, the miner that did the most work is the winner.
- Finding the winning nonce is called 'Proof of Work.'

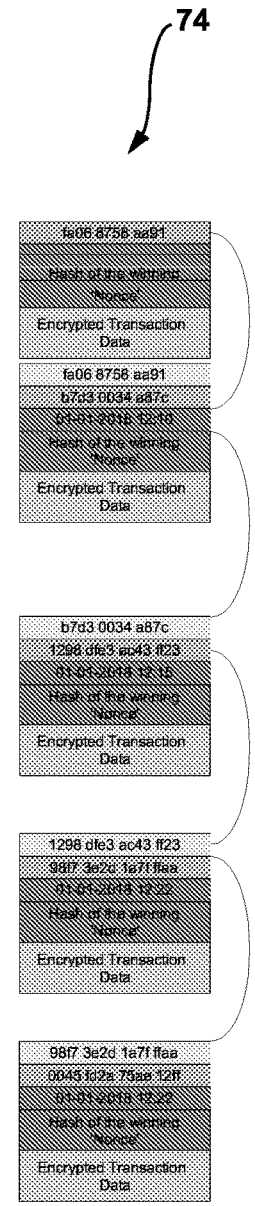

FIG. 12

Adding nonces makes block creation hard work.

A "nonce" is a random number used only once.

For example, let's add a 5 digit nonce to a string "Blockchain" and get its hash

```
Sha-256("Blockchain[00000]") = a1e2246362756d82...
```

The goal is to find the nonce that yields a hash with a specified "difficulty", i.e., the required number of leading zeros.

The only way to accomplish this is to use brute force, but with the requirement of more leading zeros, the longer the search will take.

| Message | SHA-256 |
|---|---|
| Blockchain[00000] | A1e2246362756d82... |
| Blockchain[00027] | 0276ede6a4c123dfe... |
| Blockchain[01778] | 0075af1245def1871... |
| Blockchain[13855] | 000983e1ea32df3ed... |
| Blockchain[24354] | 00006d4e1a276dc56... |
| Blockchain[26605] | 000006d53ade32568... |

6167 nonces lead a leading zero, 423 nonces yield at least two zeros,
27 at least 3 and only one yields 5 leading zeros

FIG. 13

Block with Smart Contract
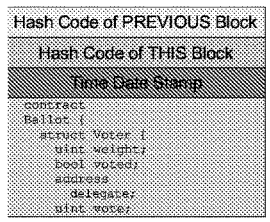
Blockchains are programable. There are many languages that are used. For example, Ethereum uses Solidity, Hyperledger uses Go.
Programs designed to reside and run on the blockchain are called "Smart Contracts" and "Chaincode" respectively. The executable code resides in the transaction data part of the block.
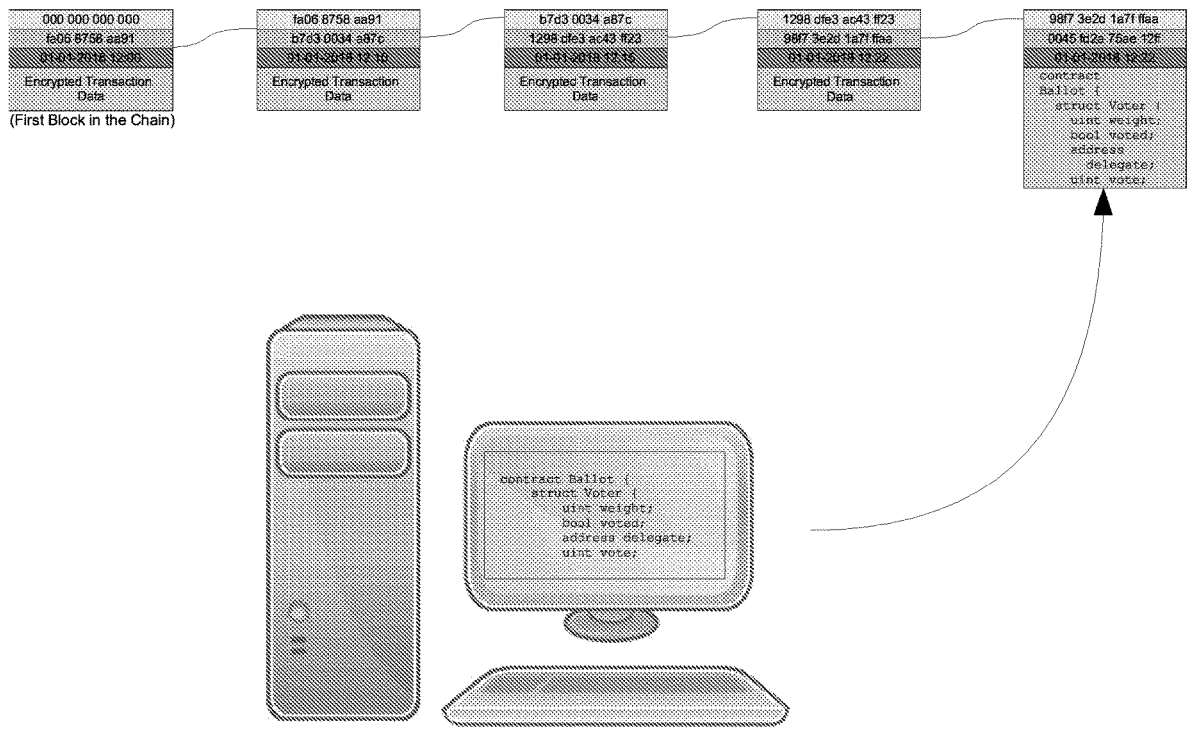
FIG. 16

Each descriptor is a string of variable length terminated with Double pipe bar characters, "||".

Each descriptor has a format, comprising: Length of file| file name [ |additional data | ... ]||

For Example
12454|picture.png||
87465|audio.amr|voice=1,4,6,2,1,8||

250

Authentication Schemes

Immutable Dual
vs.
Distributed Data Network

|  | Immutable Dual Authentication Scheme (252) | Distributed Data Network Dual Authentication Scheme (254) |
| --- | --- | --- |
| Where Hash Codes Reside | On Blockchain | On Blockchain |
| Where Talking Head Resides | On Web Server | On Blockchain Distributed Network |
| Where Talking Head Show Resides | On Web Server | On Blockchain Distributed Network |
| Publisher Verification | Public/Private Key | Publisher Code |

FIG. 35

TALKING HEAD DIGITAL IDENTITY AUTHENTICATION ON A DISTRIBUTED NETWORK

This application claims the benefit of U.S. Provisional Application No. 63/309,484, filed Feb. 11, 2022, the full disclosure of which is incorporated herein by reference.

FIELD OF THE INVENTION

Background of the Invention

The present invention relates generally to talking head digital identity authentication and more particularly to talking head digital identity immutable dual authentication on a distributed network.

Background Art

Digital communications are an important part of today's world. Individuals and businesses communicate with each other via networks of all types, including the internet. Personal computers, cell phones, e-mail, instant messaging services, and video conferencing, are among the many tools used to convey information between users, and satisfy communications needs via wireless and hard wired networks.

Information is conveyed in video, real time animated, and text based formats having video and audio content, including animated human beings or talking heads, which are capable of conveying identity, emphasizing points in a conversation, and adding emotional content.

Talking heads are used to convey the visual and audio likeness of human beings and other beings via the internet and other networks with far less bandwidth requirements than the bandwidth required to communicate the actual visual and audio likeness.

However, security is an issue. Despite the many benefits of using networks, networking raises a greater potential for security issues, such as data loss, security breaches, malicious attacks, hacking, viruses, financial losses, and intellectual property theft, among others.

Security and protection of the talking heads is necessary, including development, creation, data storage, and communication of the talking heads and associated content.

A system and method for securely creating, distributing, and viewing photo-realistic talking head based multimedia content over a network, and, in particular, a system and method for encrypting, authenticating creating, distributing, and viewing the digital identity of photo-realistic talking heads, photo-realistic head shows, and content for the photo-realistic head and photorealistic talking head shows with a digital identity immutable dual authentication and, in particular, over distributed networks is necessary.

A talking head digital identity dual authentication system and method for use on a distributed network is necessary. The talking head digital identity dual authentication system and method should be capable of being used on a distributed network having a distributed database, delivering content to users securely, and used for security and protection of the digital identity of talking heads and talking head shows on the distributed network and protect the talking heads, talking head shows, and associated content from data loss, security breaches, malicious attacks, hacking, viruses, financial losses, and intellectual property theft.

The talking head digital identity dual authentication system and method for use on a distributed network having a distributed database should be capable of talking head and talking head show security, publication, verification, and playback, using a blockchain, secure content delivery, and files stored on nodes of the distributed network.

The talking head digital identity dual authentication system and method for use on a distributed network having a distributed database should be capable of having files addressed by the hashes of their contents or hashes of data elements of their contents stored on nodes of the distributed network.

Although a variety of blockchain systems, methods, networks, databases, and content delivery systems and methods are available, none of these systems, methods, networks, databases, and content delivery systems and methods satisfies the aforementioned needs.

Although talking heads have heretofore been known, none of the talking head creation and communication systems adequately satisfies these needs.

Cheiky, et. al and Smith, et. al. were instrumental in creating and developing talking heads and a system and method for creating, distributing, and viewing photo-realistic talking head based multimedia content over a network U.S. Patent Application Publication No. 20100085363 (Smith, et al.) discloses a photo realistic talking head creation, content creation, and distribution system and method, which comprises a system and method for creating, distributing, and viewing photo-realistic talking head based multimedia content over a network, comprising a server and a variety of communication devices, including cell phones and other portable wireless devices, and a software suite, that enables users to communicate with each other through creation, use, and sharing of multimedia content, including photo-realistic talking head animations combined with text, audio, photo, and video content. Content is uploaded to at least one remote server, and accessed via a broad range of devices, such as cell phones, desktop computers, laptop computers, personal digital assistants, and cellular smartphones. Shows comprising the content may be viewed with a media player in various environments, such as internet social networking sites and chat rooms via a web browser application, or applications integrated into the operating systems of the digital devices, and distributed via the internet, cellular wireless networks, and other suitable networks.

U.S. Pat. No. 7,027,054 (Cheiky, et al.), U.S. Pat. No. 6,919,892 (Cheiky, et al.), and U.S. Pat. No. 8,553,037 (Smith, et al.) disclose do-it-yourself photo realistic talking head creation systems and methods, comprising: a template; a video camera having an image output signal of a subject; a computer having a mixer program for mixing the template and image output signal of the subject into a composite image, and an output signal representational of the composite image; a computer adapted to communicate the composite image signal thereto the monitor for display thereto the subject as a composite image; the monitor and the video camera adapted to allow the video camera to collect the image of the subject therethrough and the subject to view the composite image and the subject to align the image of the subject therewith the template; storage means having an input for receiving the output signal of the video camera representational of the collected image of the subject, and storing the image of the subject substantially aligned therewith the template.

U.S. Pat. No. 8,727,782 (Brunacini, et. al.) discloses hazard-zone incident command training and certification systems designed to train and certify persons to act as at least one responsible person(s) for decision making and management operations as part of an emergency response at incidents that contain at least one hazard zone; such hazard zone defined as any work area which contains a hazard that can injure or kill, for example, burning structures, hazardous material incidents, roadways with active traffic, natural disaster sites, and/or other emergency response scenes.

A computer system, for training at least one applicant in fire-incident management skills in at least one client-server architecture is disclosed, comprising: at least one virtual-immersion computer interface structured and arranged to provide virtual immersion to at least one applicant in at least one fire-incident management situation, wherein the virtual immersion is provided after performing a registration step comprising collecting user identification information comprising at least one management-mentor computer interface that comprises at least one management-mentor computer processor structured and arranged to generate mentoring in the at least one management-mentor computer interface, wherein the mentoring includes at least one video comprising a talking head video in which a fire chief verbally coaches the applicant. The system uses an authentication rights server to preferably authenticate user access to the server environment.

U.S. Pat. No. 10,938,725 (Sleevi) discloses a computer implemented load balancing multimedia conferencing system, device, and methods, which may be configured for multimedia videoconferencing that includes talking heads and talking head services.

A computer implemented load balancing multimedia conferencing method is disclosed that may be used to reduce processing time required for secure 2D and/or 3D multimedia network communications, and may include the steps of: enabling communication of multimedia content, having audio data that is associated with video frame data, between a sending end-point and a receiving end-point, the receiving end-point having a receiving multimedia content index; determining a load-balancing procedure that divides a video frame of the multimedia content into a first video frame portion and a second video frame portion, the first and second video frame portions associated with audio data; providing the second video frame portion and associated audio data to the receiving end-point; deriving, via the receiving end-point, a third video frame portion using the receiving multimedia content index; and combining, via the receiving end-point, the second video frame portion and derived third video frame portion into a composite video frame.

Security and encryption techniques, such as blockchain and multi-factor authentication data are discussed. Encryption techniques, such as blockchain and authentication methods, such as multi-factor authentication may be used in conjunction with sending and receiving end-point processing. The term "blockchain", as discussed, generally means a distributed database that maintains a continuously growing ledger or list of records, called blocks, secured from tampering and revision using hashes. Every time data may be published to a blockchain database the data may be published as a new block. Each block may include a timestamp and a link to a previous block. Through the use of a peer-to-peer network and a distributed timestamping server, a blockchain database is managed autonomously.

The system may include or be in communication with a blockchain network, having one or more nodes, which may be in communication with one or more servers, and/or client devices. The blockchain network may manage a distributed blockchain database containing data recorded by the one or more electronic devices of the system. The data recorded by the one or more electronic devices may be maintained as a continuously growing ledger or listing of the data recorded by the one or more electronic devices, which may be referred to as blocks, secured from tampering and revision. Each block includes a timestamp and a link to a previous block. Through the use of a peer-to-peer blockchain network and a distributed timestamping server, a blockchain database may be managed autonomously. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction data input results in a different hash value being computed, which indicates potentially compromised transaction input. Digital signatures ensure that data entry transactions (data added to the blockchain database) originated from senders (signed with private keys) are not imposters. At its core, a blockchain database may record the chronological order of data entry transactions with all nodes agreeing to the validity of entry transactions using the chosen consensus model. The result is data entry transactions that are irreversible and agreed to by all members in the blockchain network.

U.S. Pat. No. 10,867,061 (Collart) discloses systems and methods for authorizing rendering of objects in three-dimensional spaces. The system may include a first system defining a virtual three-dimensional space, including the placement of a plurality of objects in the three-dimensional space, and a second system including a plurality of rules associated with portions of the three-dimensional space and a device coupled to the first system and the second system. The device may receive a request to render a volume of three-dimensional space, retrieve objects for the volume of three-dimensional, retrieve rules associated with the three-dimensional, and apply the rules for the three-dimensional space to the objects.

A registry, which may be used to protect against malicious bots that try to scam or imitate people is disclosed; determine if a voice is real versus auto-generated from the latest generation of deep neural networks; determine if a face is real versus auto-generated; determine changes to security methods we use today (as today's voice recognition or video of a talking head might not be real or valid in the future); determine what type of data virtual assistants and robotic or autonomous devices are allowed to capture, when, how is it used, and how a consumer can control.

The registry may be centralized or decentralized (i.e., using blockchain distributed ledger-based solution). Applications may be registered using a blockchain or another immutable database.

U.S. Pat. No. 9,124,650 (Maharajh, et al.) digital rights management in a mobile environment. Embodiments are discussed, which provide a method that causes a plurality of virtual machine instructions to be interpreted for indications of a mobile device's hardware identification information, thus forming a plurality of hardware instruction interpretations. Talking heads, encryption, authentication, and cipher block chaining techniques are discussed. The embodiment also combines each of the plurality of hardware instruction interpretations and hashes the combination to form a quasi-hardware device identifier. An encryption process is based on the quasi-hardware encryption device identifier and the media is then encrypted using the encryption process. The encrypted media is transferred to the mobile device wherein the mobile device decrypts the media based at least in part on the mobile device's internal knowledge of the quasi-hardware device identification.

U.S. Pat. No. 11,095,449 (Wang) discloses a system and method for securely processing an electronic identity. The method comprises: receiving, by an endpoint device, from an access device, interaction data; generating, by the endpoint device, an interaction record comprising the interaction data and an electronic identity of a user, the electronic identity being mathematically derived from a combination of information associated with the user; retrieving, by the endpoint device, a private key of the user; signing, by the endpoint device, the interaction record using the private key of the user; encrypting, by the endpoint device, at least the interaction data using a limited-use key associated with limited-use parameters to form a cryptogram; and transmitting, by the endpoint device, to the access device, the cryptogram and the signed interaction record, wherein the cryptogram is thereafter forwarded to a server computer in an authorization request message, and wherein the server computer is configured to decrypt the cryptogram and validate the electronic identity, wherein the signed interaction record is also signed using a private key of a resource provider and further comprises a transaction timestamp. The method may further comprise: the server computer validating the electronic identity utilizing a distributed network, the distributed network comprising a blockchain.

A talking head and talking head show, comprising a photo-realistic moving likeness of an individual that looks and speaks as the individual does was developed by VeraSprite, a California based company owned by AvaWorks, Inc., also a California based company, and disclosed in U.S. Pat. Nos. 6,919,892 and 7,027,054 (both of Cheiky, et. al.) on Jul. 19, 2005, and Apr. 11, 2006, respectively VeraSprite's technology creates a photo-realistic likeness, a talking head and talking head show, of a spokesperson, professional, or an ordinary human being. After creating their talking head once, the spokesperson need only use his or her voice to create new messages. The person's voice is automatically coordinated with his or her own moving image.

Sponsors can transmit a spokesperson in a moving, lifelike, audio-visual message along with background graphics and slides directly to mobile devices. In addition, sponsors may embed quizzes or links to their websites in their message. Unlike text based messages, talking heads give sponsors an easy, highly personalized, multimedia way to communicate with specialized audiences.

Currently, VeraSprite's technology is used to play multimedia shows on tablets, cell phones, and watches.

AvaWorks, Inc. is a privately held Santa Monica, California based company doing business as VeraSprite™. VeraSprite owns patented technology enabling transmission of photo-realistic moving images to mobile devices.

Security and protection of talking heads and safeguarding the digital identity of the talking heads remains an issue. Despite the many benefits of using networks, networking raises a greater potential for security issues, such as data loss, security breaches, malicious attacks, hacking, viruses, financial losses, and intellectual property theft, among others.

Security and protection of the talking heads and, in particular, security and protection of the digital identity of the talking heads is necessary, during development and creation, and for data storage and communications of the talking heads and associated content, especially over distributed networks Although talking heads have heretofore been known, none of the talking head creation and communication systems adequately satisfies the aforementioned needs.

For the foregoing reasons, there is a need for a talking head digital identity immutable dual authentication system and method for use over distributed networks, which protects the talking heads, talking head shows, and associated content from data loss, security breaches, malicious attacks, hacking, viruses, financial losses, and intellectual property theft.

The talking head digital identity immutable dual authentication system and method for use over distributed networks should have a system and method for securely creating, distributing, and viewing photo-realistic talking head based multimedia content over a distributed network, and, in particular, a system and method for creating, encrypting, authenticating, distributing, and viewing the digital identity of photo-realistic talking heads, photo-realistic head shows, and content for the photo-realistic head and photorealistic talking head shows with digital identity immutable dual authentication over a distributed network is necessary.

SUMMARY

The present invention is directed to improvements in security and protection of talking heads and talking head shows and, in particular, a system, method, and scheme for security and protection of the digital identity of talking heads and talking head shows, and associated content from data loss, security breaches, malicious attacks, hacking, viruses, financial losses, and intellectual property theft over distributed networks.

A system, method, and scheme for security and protection of the digital identity of the talking heads and talking head shows, comprises a talking head digital identity immutable dual authentication system and method for use over a distributed network.

Talking head and talking head show security, publishing, verification, and playback of the present invention uses a blockchain, files stored on nodes of a distributed network, and dual authentication.

The system, method, and scheme of the present invention may be used to securely create, distribute, and view photo-realistic talking head based multimedia content over a network, and, in particular, create, encrypt, and authenticate the digital identity of photo-realistic talking heads, photo-realistic talking head shows, and content on cell phones, tablets, and other portable devices over a network.

The system, method, and scheme for security and protection of the digital identity of the talking heads and talking head shows, comprises a talking head digital identity immutable dual authentication system and method for use over a distributed network having nodes, which store talking head and talking head show files, and a blockchain, which has hash values of the talking head and talking head show, each of which are downloaded to one or more digital devices.

A talking head digital identity immutable dual authentication method for use over a distributed network having features of the present invention, comprises: downloading talking head and talking head show files from nodes of a distributed network; downloading final hash values of the talking head and talking head show from a blockchain; sending a hash of a publisher's identification of the publisher of the talking head show and the talking head from the blockchain to a name lookup service; retrieving and confirming the identity of the publisher of the talking head show and the talking head from the name look up service; recalculating hash values of the talking head and talking head show; comparing the recalculated hash values of the talking head and the talking head show with the hash values of the talking head and the talking head show retrieved from the blockchain; starting playback of the talking head show if the hash values received from the blockchain match the recalculated hash values of the talking head and the talking head show retrieved from the nodes of the distributed network.

If the hash values received from the blockchain do not match the recalculated hash values of the talking head and the talking head show retrieved from the nodes of the distributed network, then playback does not start.

The talking head digital identity immutable dual authentication method for use over a distributed network assures the integrity of the talking head and talking head show, associated data and content, and the origin of the talking head and talking head show.

The talking head and talking head show may be any suitable talking head and/or talking head show. It should be noted that both a VeraSprite™ talking head and/or talking head show are well suited for use in the talking head digital identity dual authentication system, method, and scheme on a distributed network.

DRAWINGS

These and other features, aspects, and advantages of the present invention will become better understood with regard to the following description, appended claims, and accompanying drawings where:

FIG. 12 is a schematic representation of blockchain mining and proof of work;

FIG. 13 is a schematic representation of adding nonces to a blockchain;

FIG. 16 is a schematic representation showing that blockchains are programmable;

FIG. 35 is a schematic representation of features of immutable blockchain authentication schemes.

DESCRIPTION

The preferred embodiments of the present invention will be described with reference to FIGS. 1-35 of the drawings. Identical elements in the various figures are identified with the same reference numbers.

Figure 1:
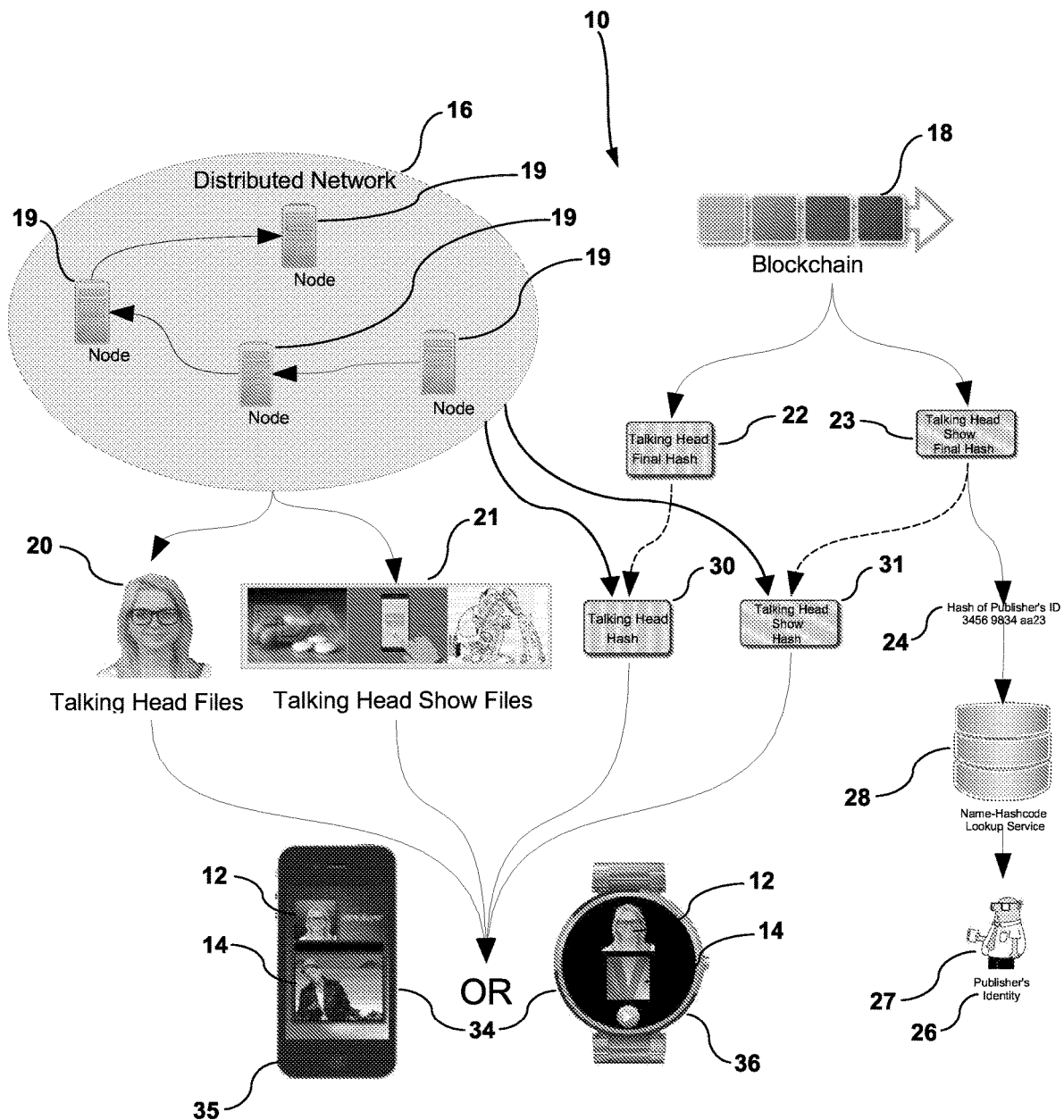
FIG. 1 is a schematic representation of a talking head digital identity dual authentication system and method on a distributed network, constructed in accordance with the present invention.

FIG. 1 shows an embodiment of the present invention, a talking head digital identity dual authentication system and method on a distributed network 10, constructed in accordance with the present invention. The talking head digital identity dual authentication system and method on a distributed network 10 of the present invention is used for security and protection of the digital identity of talking heads 12 and talking head shows 14 on a distributed network 16 and protects the talking heads 12, talking head shows 14, and associated content from data loss, security breaches, malicious attacks, hacking, viruses, financial losses, and intellectual property theft. Talking head and talking head show security, publishing, verification, and playback are shown, using a blockchain 18, files stored on nodes 19 of the distributed network 16, and dual authentication.

The talking head digital identity immutable dual authentication system, method, and scheme of the present invention is directed to talking head 12 and talking head show 14 publishing, verification, and playback, using the blockchain 18, and dual authentication over the distributed network 16.

A talking head digital identity immutable dual authentication method for use over a distributed network 16 of the present invention, comprises: downloading talking head and talking head show files 20 and 21, respectively, from nodes 19 of the distributed network 16; downloading final hash values 22 and 23 of the talking head 12 and talking head show 14, respectively, from the blockchain 18; sending a hash 24 of a publisher's identification 26 of the publisher 27 of the talking head show 14 and the talking head 12 from the blockchain 18 to a name lookup service 28; retrieving and confirming the identity 26 of the publisher 27 of the talking head show 14 and the talking head 12 from the name look up service 28; recalculating hash values of the talking head 12 and talking head show 14, respectively; comparing recalculated hash values 30 and 31 of the talking head 12 and the talking head show 14, respectively, with the hash values 22 and 23 of the talking head 12 and the talking head show 14, respectively, retrieved from the blockchain 18; starting playback 34 of the talking head 12 and talking head show 14 on playback devices 35 and/or 36 if the hash values 22 and 23, respectively, received from the blockchain 18 match the recalculated hash values 30 and 31, respectively, of the talking head 12 and the talking head show 14 retrieved from the nodes 19 of the distributed network 16.

The talking head 12 and talking head show 14 may be played back on playback devices 35 and/or 36 or any other suitable playback device.

Again, if the hash values 22 and 23 received from the blockchain 18 match the recalculated hash values 30 and 31, respectively, of the talking head 12 and the talking head show 14, each respectively, retrieved from the nodes 19 of the distributed network 16, then playback 34 starts. This assures the integrity of the talking head 12 and talking head show 14, associated data and content, and the origin of the talking head 12 and talking head show 14.

If the hash values 22 and 23 received from the blockchain 18 do not match the recalculated hash values 30 and 31 of the talking head 12 and the talking head show 14, respectively, retrieved from the nodes 19 of the distributed network 16, then playback 34 does not start. Again, this assures the integrity of the talking head 12 and talking head show 14, associated data and content, and the origin of the talking head 12 and talking head show 14.

The talking head 12 and talking head show 14 may be any suitable talking head 12 and/or talking head show 14. It should be noted that both a VeraSprite™ talking head and/or talking head show are well suited for use in the talking head digital identity dual authentication system, method, and scheme on a distributed network 10 of FIG. 1.

Figure 2:
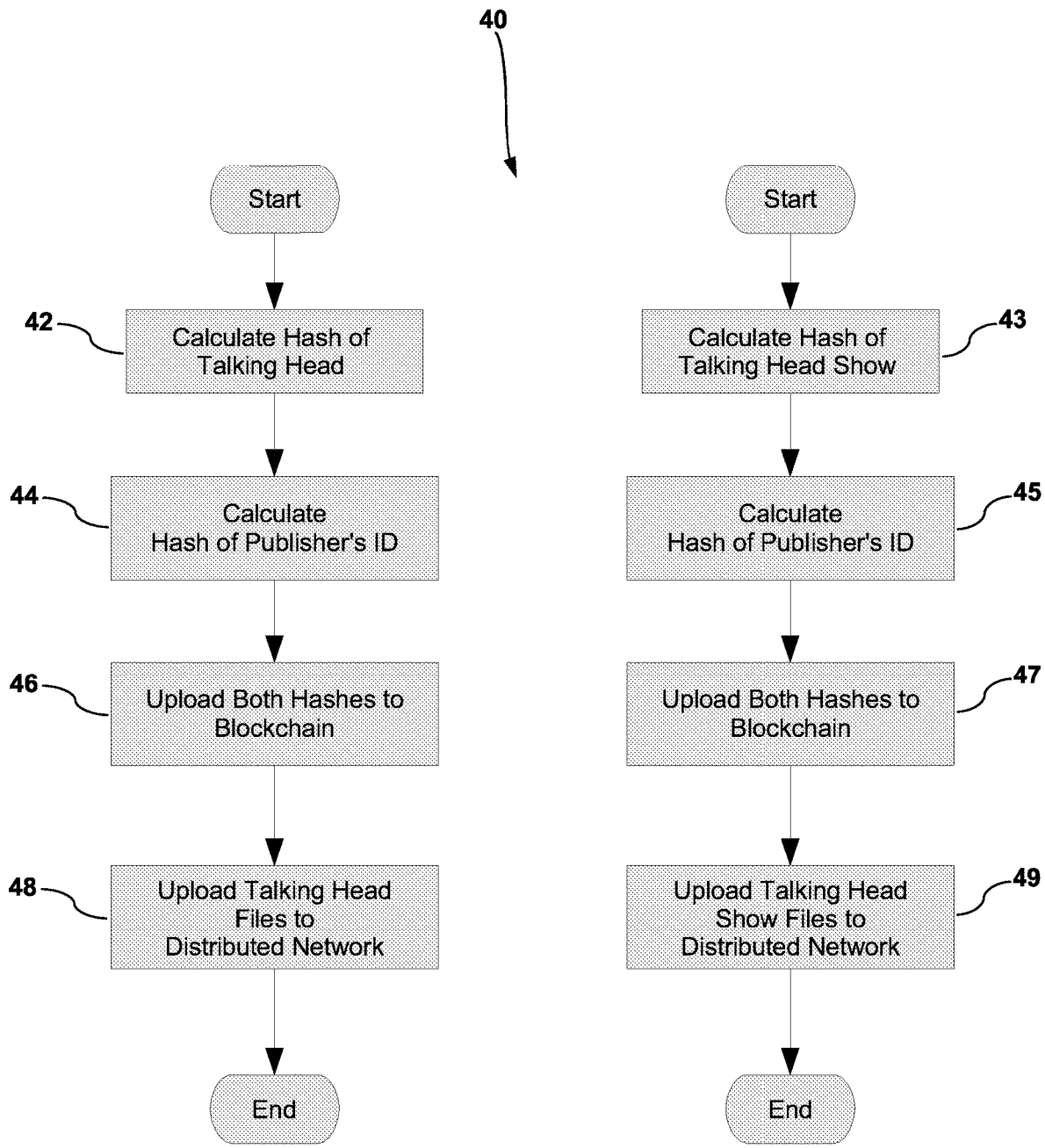
FIG. 2 is a talking head and talking head show publishing flow chart.

FIG. 2 is a schematic representation of talking head and talking head show publication 40, in accordance with the present invention. FIG. 2 shows steps of publishing a talking head 12 and talking head show 14, including: calculating, at 42 and 43, hashes 22 and 23 of a talking head 12 and talking head show 14, respectively; calculating, at 44 and 45, hashes 24 of a publisher's identification 26, respectively, for each; uploading, at 46 and 47, the hashes 22 and 23 of the talking head 12 and talking head show 14, respectively, and the hashes 24 of the publisher's identification 26 for each to a blockchain 18; and uploading, at 48 and 49, talking head and talking head show files and 21, respectively, to a distributed network 16, which may be a swarm, such as, for example, a distributed network having a swarm protocol, or other suitable distributed network.

In more detail, the talking head and talking head show method 40 of FIG. 2 comprises the steps of:

(steps 42 and 43): calculating hashes 22 and 23 of a talking head 12 and talking head show 14, respectively;

(steps 44 and 45): calculating hashes 24 of a publisher's identification 26 for the talking head 12 and talking head show 14, respectively, for each;

(steps 46 and 47): uploading the hashes 22 and 23 of the talking head 12 and taking head show 14, respectively, and the hashes 24 of the publisher's identification 26 of the talking head 12 and talking head show 14 to a blockchain 18;

(steps 48 and 49): uploading talking head files 20 and talking head show files 21 to a distributed network 16.

Figure 3:
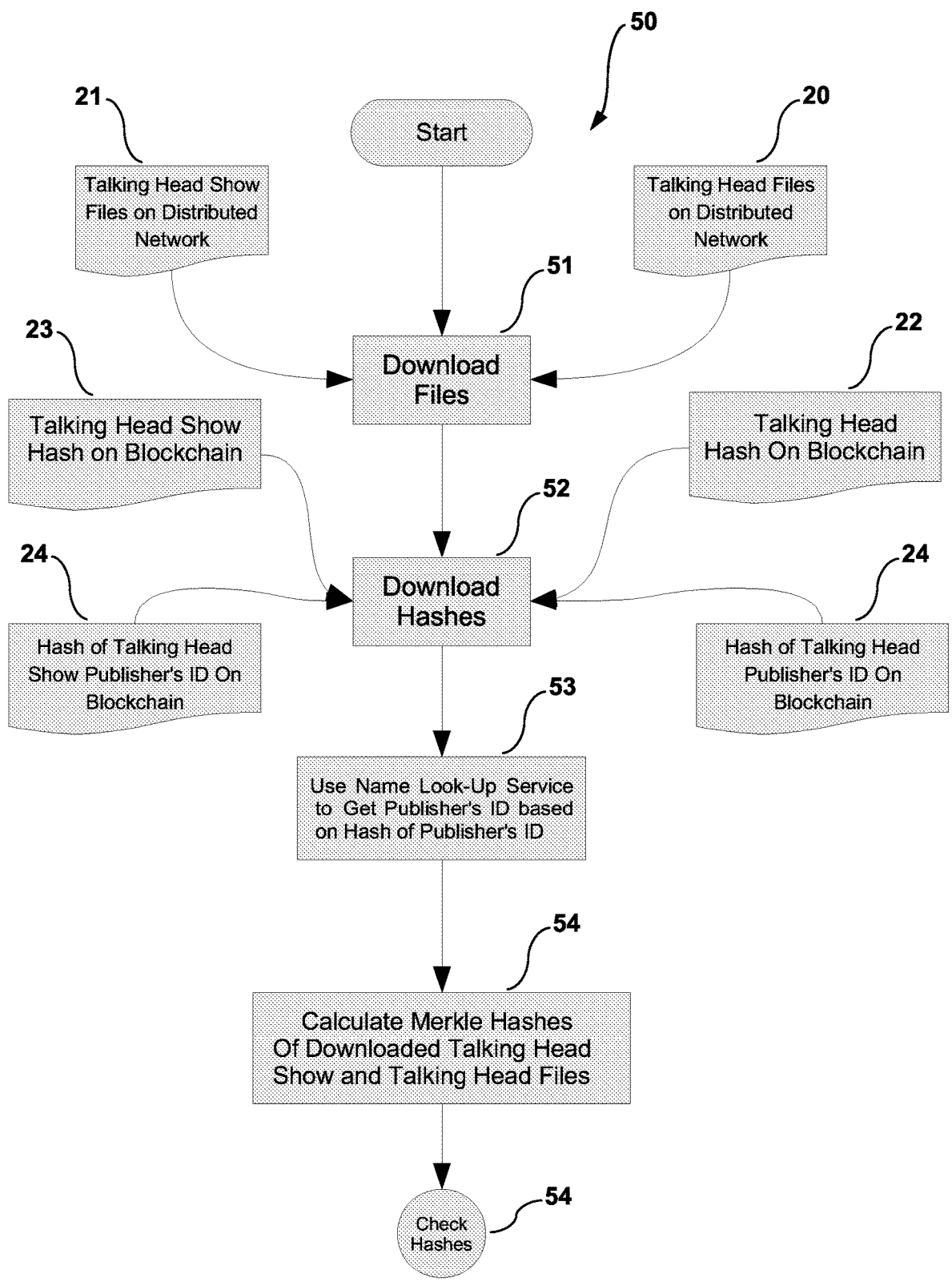
FIG. 3 is a talking head and talking head show playback verification flow chart.

FIG. 3 is a schematic representation of talking head and talking head show playback verification 50, in accordance with the present invention. FIG. 3 shows steps of talking head and talking head show playback verification 50, including: downloading, at 51, talking head and talking head show files, 20 and 21, respectively, from a distributed network 16; downloading, at 52, talking head and talking head show hashes, 22 and 23, respectively, and talking head and talking head show publisher identification hashes 24, each from a blockchain 18; using, at 53, a name look up service 28 to obtain the publisher's identification 26 from the hashes 24 of the publisher's identity 26; and calculating, at 54, Merkle hashes 56 of the downloaded talking head and talking head show files 20 and 21, respectively (shown later in FIG. 29).

In more detail, the talking head and talking head show playback method 50 of FIG. 3 comprises the steps of:

(step 51): downloading talking head and talking head show files, 20 and 21, respectively, from a distributed network 16;

(step 52): downloading talking head and talking head show hashes, 22 and 23, respectively, from a blockchain 18;

(step 52): downloading talking head and talking head show publisher identification hashes 24 from the blockchain 18;

(step 53): using a name look up service 28 to obtain the publisher's identification 26, using the hashes 24 of the publisher's identity 26;

(step 54): calculating Merkle hashes 56 of the downloaded talking head and talking head show files 20 and 21, respectively.

Figure 4:
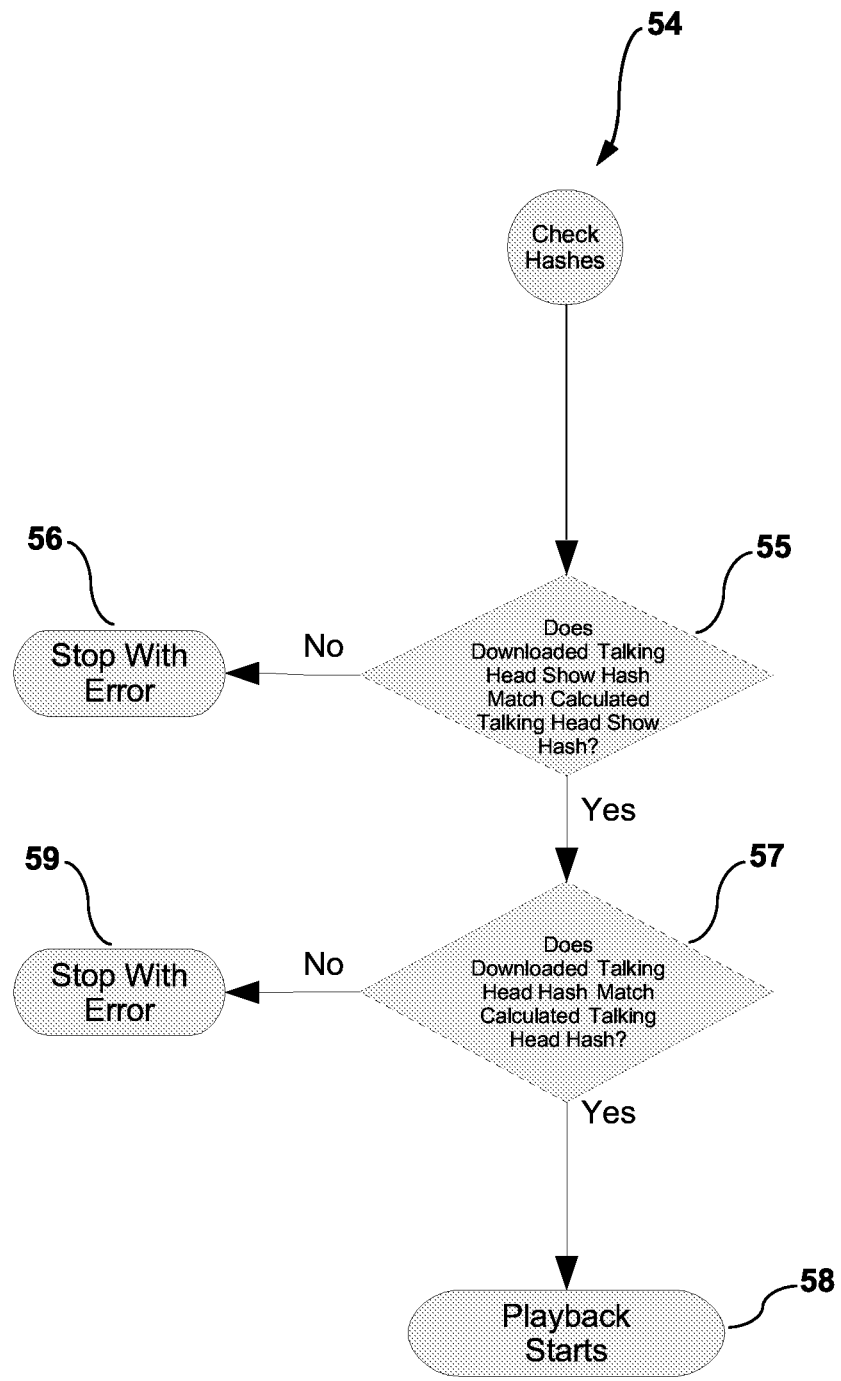
FIG. 4 is a talking head and talking head show playback verification flow chart, which is a continuation of FIG. 3.

FIG. 4 is a talking head and talking head show playback verification flow chart 54, which is a continuation of FIG. 3, which shows the hashes being checked. The talking head show hash 23 is downloaded and checked against a calculated talking head show hash 31 at step 55; and if the downloaded talking head show hash 23 and the calculated talking head show hash 31 match, then playback verification continues; otherwise, playback verification stops with an error at step 56.

If playback verification continues, the talking head hash 22 is downloaded and checked against a calculated talking head hash 30 at step 57, and if the downloaded talking head hash 22 and the calculated talking head hash 30 match, then playback 34 starts at step 58; otherwise, playback verification stops with an error at step 59.

Figure 5:
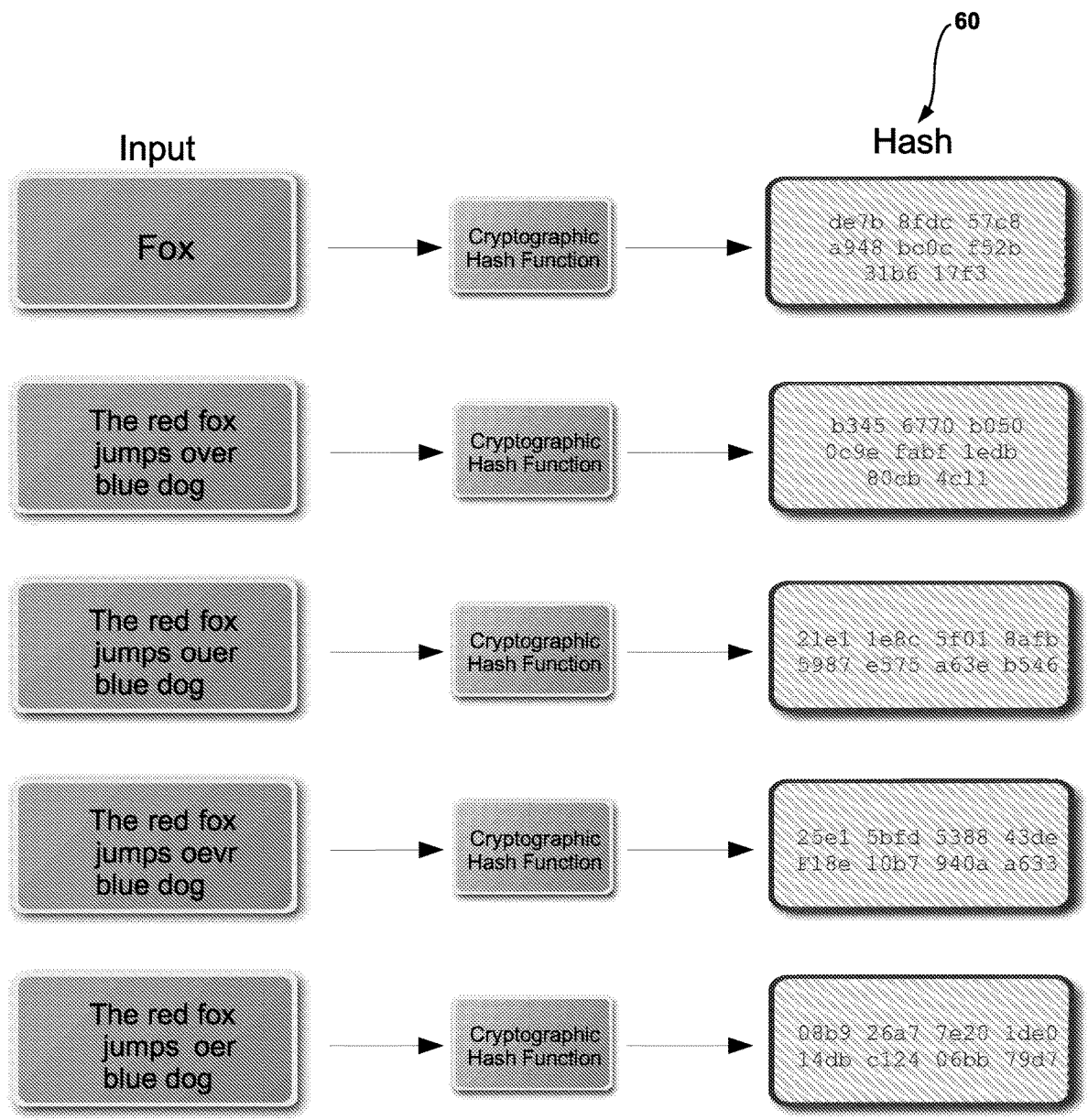
FIG. 5 is a schematic representation of cryptographic hash codes of different inputs.
Figure 6:
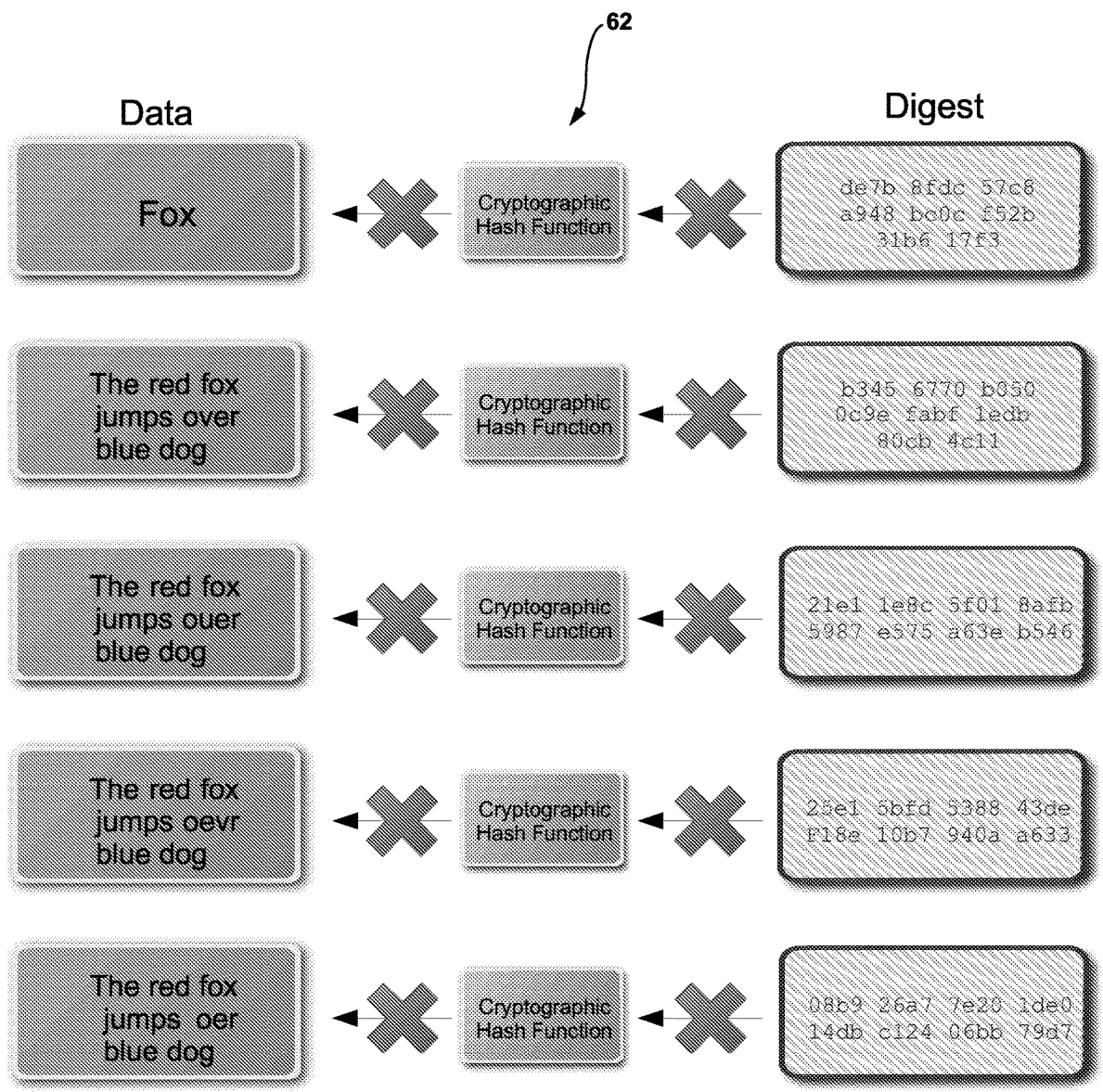
FIG. 6 is a schematic representation of non reversibility of cryptographic hash codes.

FIGS. 5 and 6 discuss cryptographic hash functions.

FIG. 5 is a schematic representation of cryptographic hash codes 60 for different inputs and resulting hashes for each of the different inputs. FIG. 5 shows that different inputs result in different hashes. Data input into a hash function generates a string of characters unique to the data, which are one way hashes, each generating a unique hash for a different input. A hash is typically a string of characters generated by a formula.

FIG. 6 is a schematic representation of non reversibility of cryptographic hash functions 62. A cryptographic hash function converts input data into a unique hash, but cannot convert the unique hash back into the original input data.

Blockchain is a shared, immutable ledger that facilitates the process of recording transactions and tracking assets in a business network. An asset can be tangible (a house, car, cash, land) or intangible (intellectual property, patents, copyrights, branding). Virtually anything of value can be tracked and traded on a blockchain network, reducing risk, and cutting costs for all involved.

Figure 7:
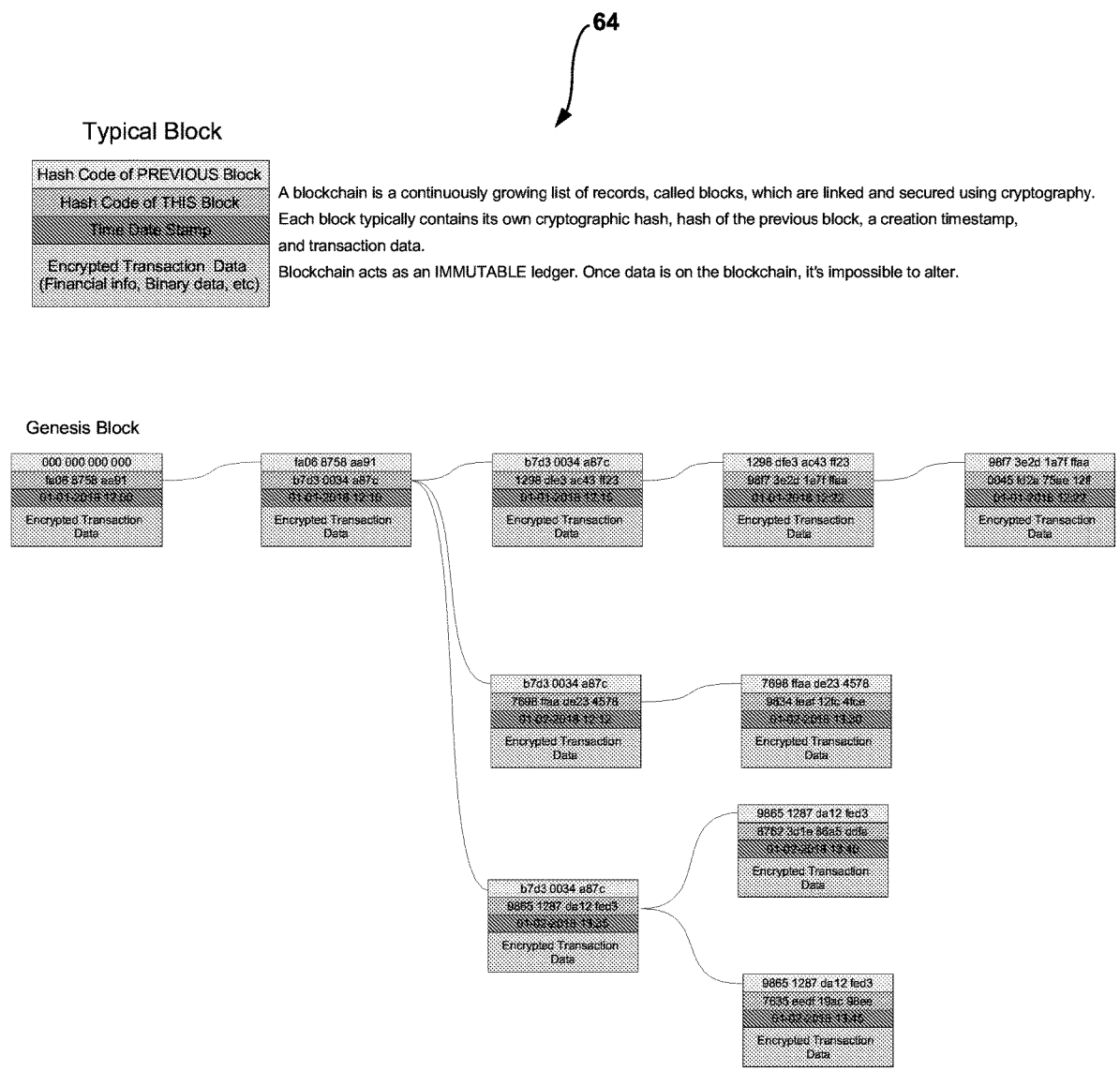
FIG. 7 is a schematic representation of formation of a blockchain.
Figure 8:
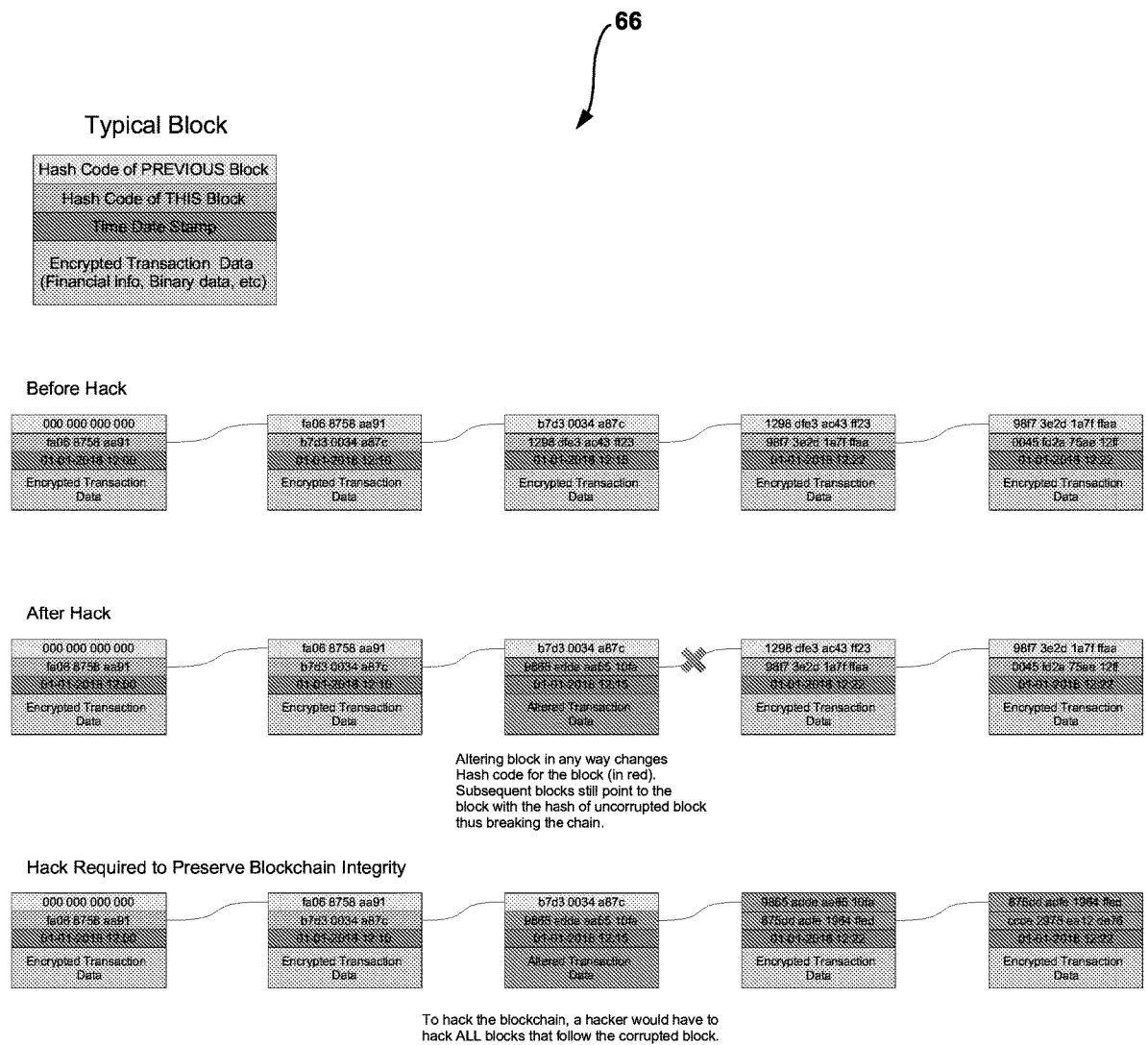
FIG. 8 is a schematic representation of blockchain security.

FIGS. 7 and 8 discuss blockchain and blockchain security, respectively.

FIG. 7 is a schematic representation of formation of a blockchain 64. A blockchain is a growing list of records, called blocks, which are linked together using cryptography. Each block contains a cryptographic hash of the previous block, a timestamp, and transaction data (generally represented as a Merkle tree). The timestamp proves that the transaction data existed when the block was published in order to get into its hash. Each block contains information about the block previous to it, the contiguous blocks forming a chain, with each additional block reinforcing the blocks before it. Once recorded, the data in any given block cannot be altered retroactively, without altering all subsequent blocks. Blockchains are, thus, resistant to modification of their data.

FIG. 8 is a schematic representation of blockchain security 66, and shows a blockchain before and after an attempted hack. Blocks have certain storage capacities and, when filled, are closed, and linked to the previously filled block, forming a chain of data known as the "blockchain." All new information that follows that freshly added block is compiled into a newly formed block that will then also be added to the chain once filled. Altering any block in any way in the blockchain changes the hash code for the block (in red). Subsequent blocks still point to the block with the hash of the uncorrupted block, thus, breaking the chain. To hack the blockchain, a hacker would have to hack all blocks that follow the corrupted block in the blockchain.

While blockchain has been touted as virtually "unhackable," it's important to remember that most blockchain transactions have endpoints that are far less secure. Blockchain security is further addressed here with the addition of additional authentication, discussed, later.

Figure 9:
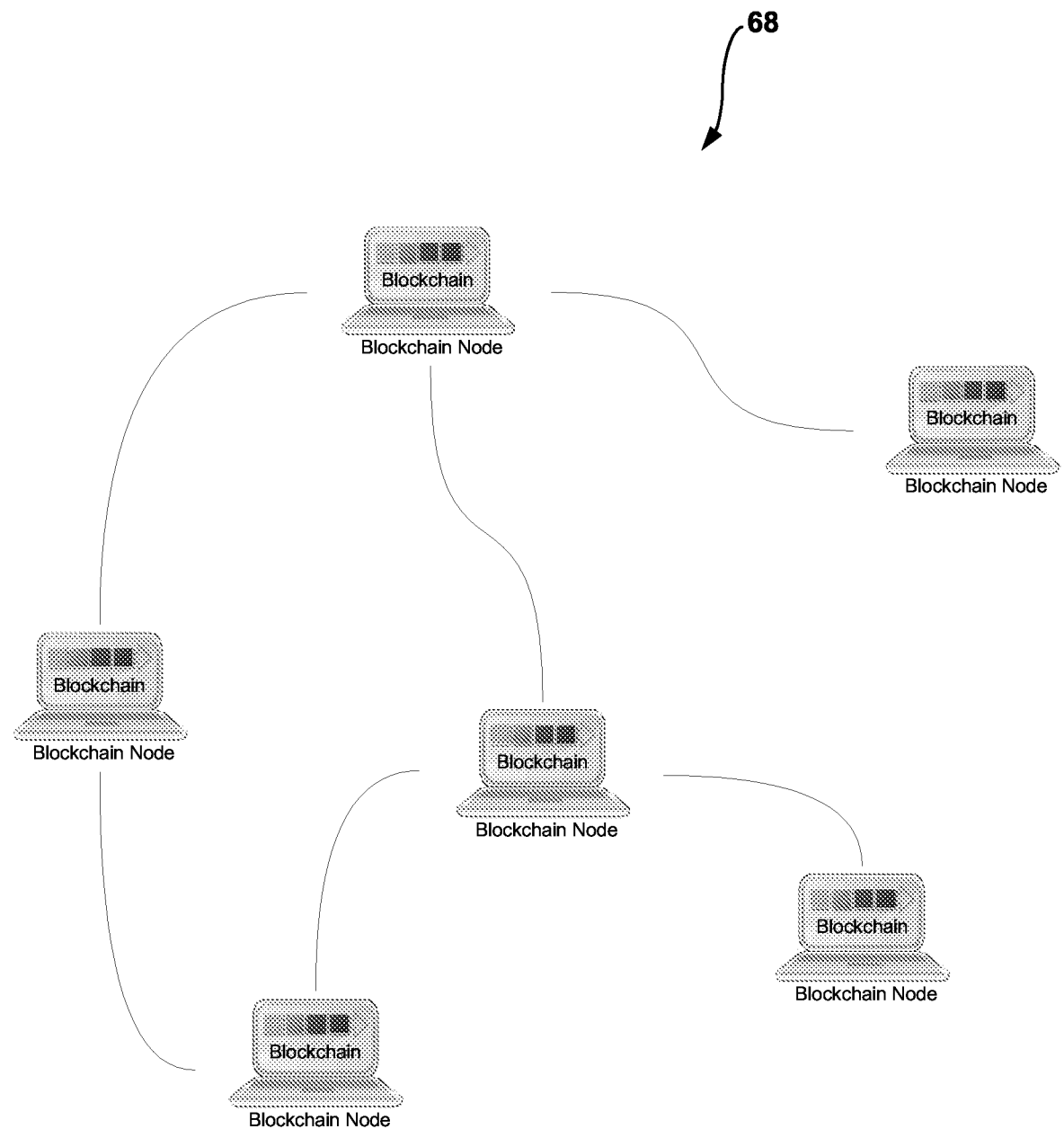
FIG. 9 is a schematic representation of blockchain peer to peer networking.
Figure 10:
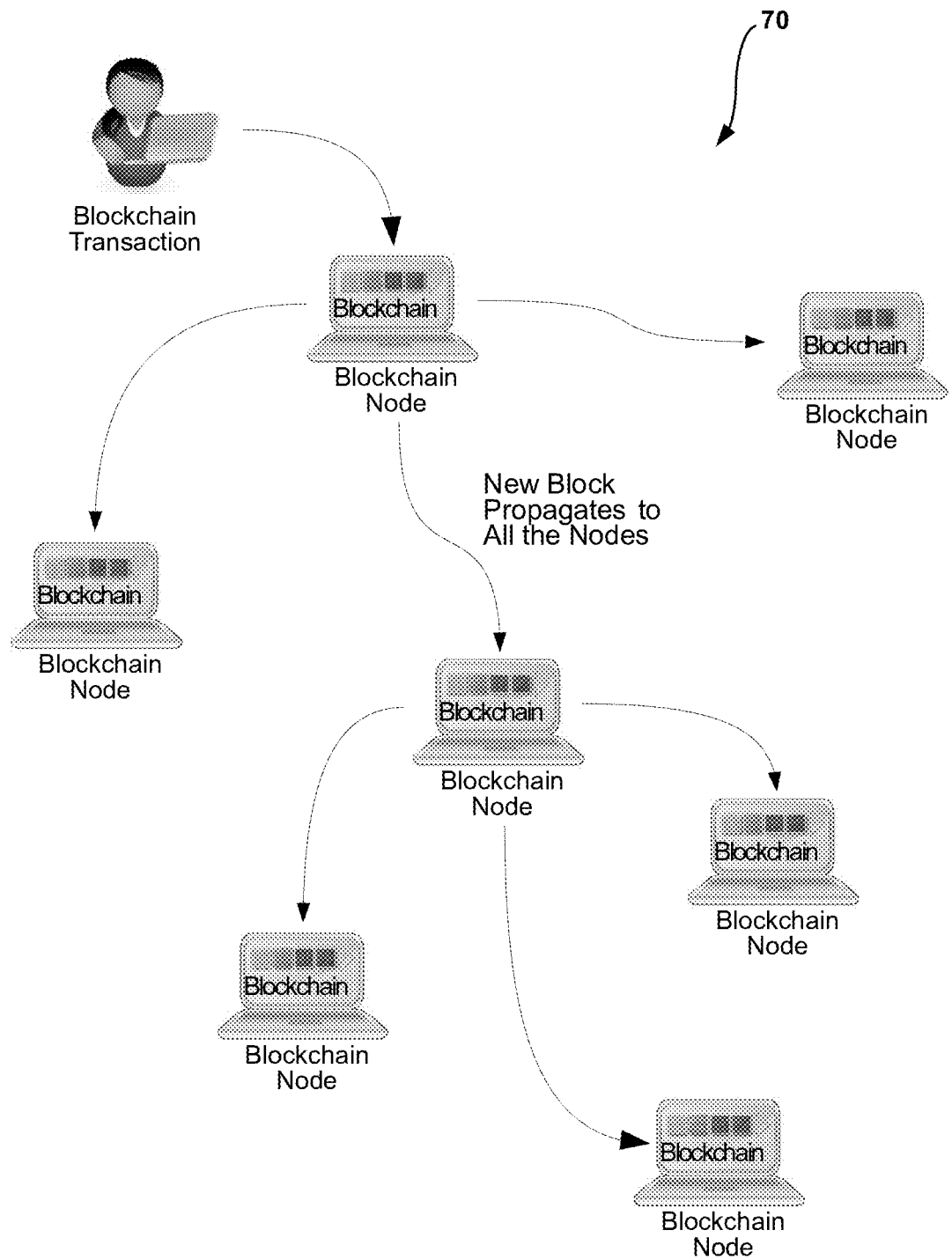
FIG. 10 is a schematic representation of blockchain peer to peer networking showing a blockchain transaction.
Figure 11:
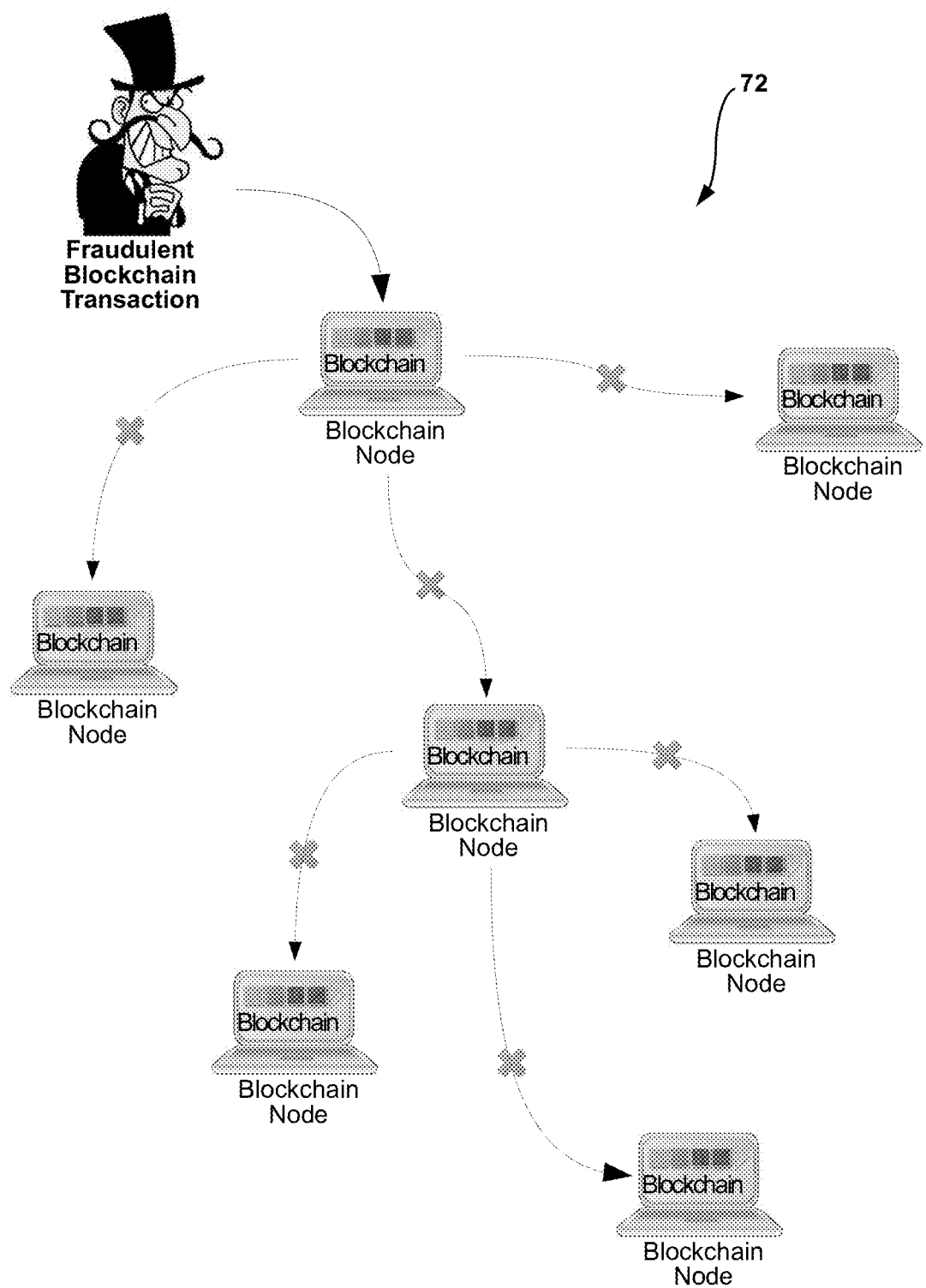
FIG. 11 is a schematic representation of blockchain peer to peer networking showing a fraudulent blockchain transaction.

FIGS. 9-11 discuss blockchain peer to peer networking.

FIG. 9 is a schematic representation of a blockchain using a peer to peer networking architecture 68. Blockchains are typically managed by a peer-to-peer network for use as a publicly distributed ledger, where nodes collectively adhere to a protocol to communicate and validate new blocks.

Peer-to-peer computing or networking is a distributed application architecture that partitions tasks or workloads between peers. Peers are equally privileged, equipotent participants in the application. The peers are said to form a peer-to-peer network of nodes, which are either redistribution points or communication endpoints, and may be machines or electronic devices that are attached to a network, and are capable of creating, receiving, or transmitting information over a communication channel.

In the peer to peer networking architecture, shown in FIG. 9, each node has a copy of the blockchain and checks transactions on all other nodes.

FIG. 10 is a schematic representation, which shows that when a blockchain transaction is performed at one of the nodes, a new block is created, which propagates to all the nodes in the peer to peer network 70. The node where the transaction is performed sends a new block to the next node, which updates the blockchain. That node, in turn, sends the new block to the next node, and so on. Ultimately, all the nodes have a copy of the new block.

FIG. 11 is a schematic representation, which shows that since all nodes have a copy of the blockchain, all nodes must agree that a transaction is valid 72. If a fraudulent blockchain transaction is performed and a fraudulent block is created, the nodes reject the fraudulent block. To make a blockchain harder to hack, a random element is added during new block creation.

FIG. 12 shows that crypto mining comprises adding transactions to an existing blockchain ledger of transactions, which is distributed among all users of a blockchain 74, and discusses blockchain mining and proof of work. In mining, a hash of a block of transactions is created, which cannot be easily forged, which protects the integrity of an entire blockchain, without the need of a central system.

In order to secure a blockchain, a consensus protocol called "proof of work" is used. In the proof of work protocol, all the nodes on the network agree on the state of information in the process of "mining", which is directed to prevent economic attacks.

Blockchain mining comprises adding transactions to an existing blockchain ledger of transactions distributed among all users of a blockchain. While mining is mostly associated with bitcoin, other technologies that use a blockchain also employ mining. Mining includes creating a hash of a block of transactions that cannot be forged easily, thus, protecting the integrity of the entire blockchain without the need for a central system.

Cryptocurrency mining is somewhat similar to mining precious metals. While miners of precious metals unearth the precious metals, crypto miners trigger the release of new coins into circulation. For miners to be rewarded with new coins, the miners deploy machines that solve complex mathematical equations in the form of cryptographic hashes.

A hash is a truncated digital signature of a chunk of data. Hashes are generated to secure data transferred on a public network. Miners compete with their peers to zero in on a hash value generated by a crypto coin transaction, and the first miner to crack the code gets to add the block to the ledger and receive the reward.

Each block uses a hash function to refer to the previous block, forming an unbroken chain of blocks that leads back to the first block. For this reason, peers on the network can easily verify whether certain blocks are valid and whether the miners who validated each block properly solved the hash to receive the reward.

The mining process involves computing a hash of a number called a nonce, which is an abbreviation for a number used only once. The nonce is an arbitrary number that is used just once in a cryptographic communication and is often a random or pseudo-random number issued in an authentication protocol to ensure that old communications cannot be reused in replay attacks.

FIG. 13 shows that adding nonces to a blockchain makes block creation arduous work 76. The goal is to find the nonce that yields a hash with a specified "difficulty", i.e., the required number of leading zeroes, which is a measure of how difficult it is to mine a cryptocurrency block, or in more technical terms, to find a hash below a given target. A high difficulty means that it will take more computing power to mine the same number of blocks, making the network more secure against attacks.

No advanced math or computation is really involved. What miners are actually doing is trying to be the first miner to come up with a 64-digit hexadecimal number (a "hash") that is less than or equal to the target hash, which is basically guesswork Mining is a matter of guesswork or randomness, but with the total number of possible guesses for each of these problems being in the order of trillions, mining is incredibly arduous work. The number of possible solutions only increases as more miners join the mining network (known as the mining difficulty). In order to solve a problem first, miners require significant computing power. To mine successfully, a miner needs to have a high "hash rate," which is measured in terms gigahashes per second (GH/s) and terahashes per second (TH/s).

Figure 14:
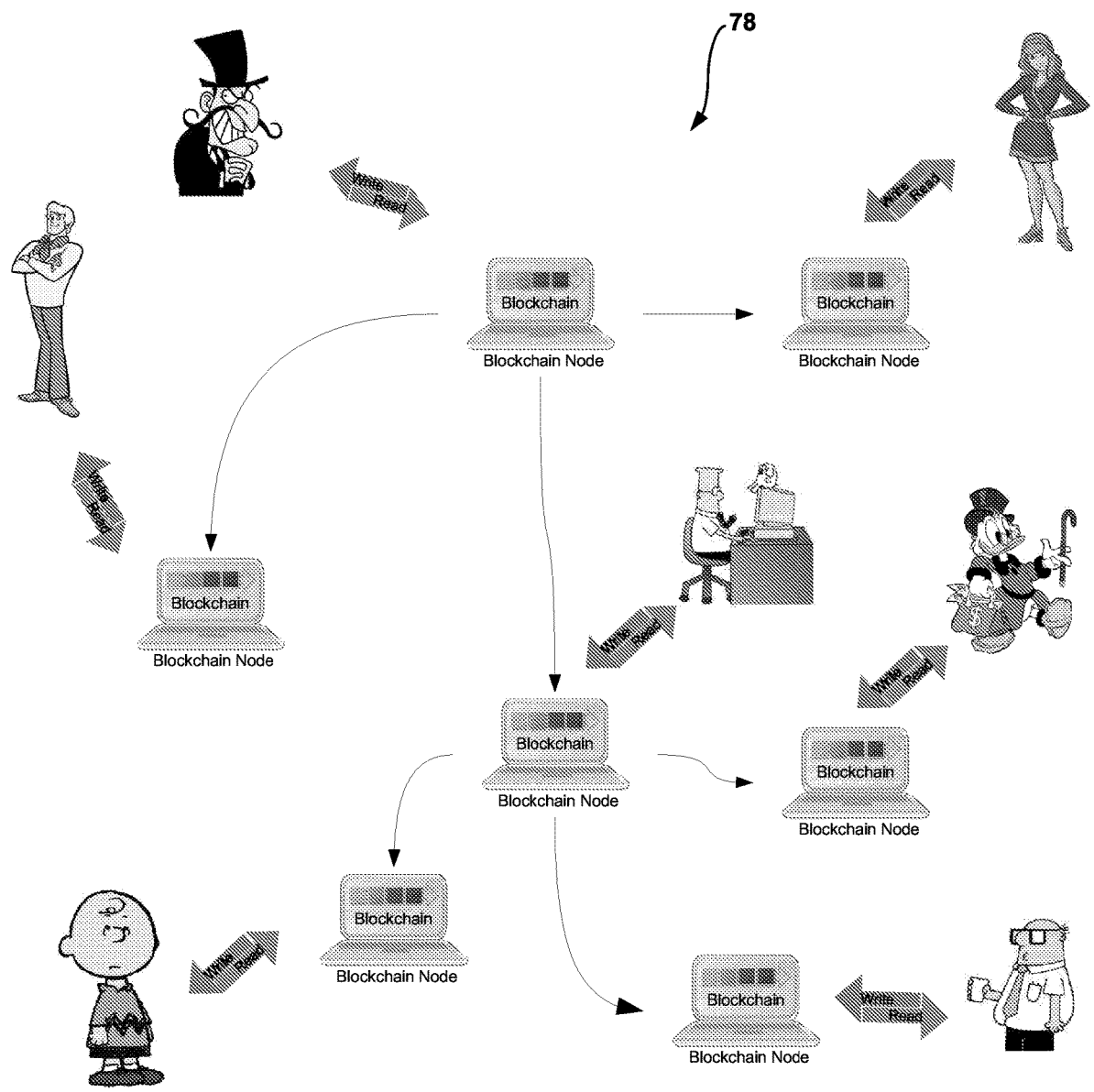
FIG. 14 is a schematic representation of a permissionless blockchain.
Figure 15:
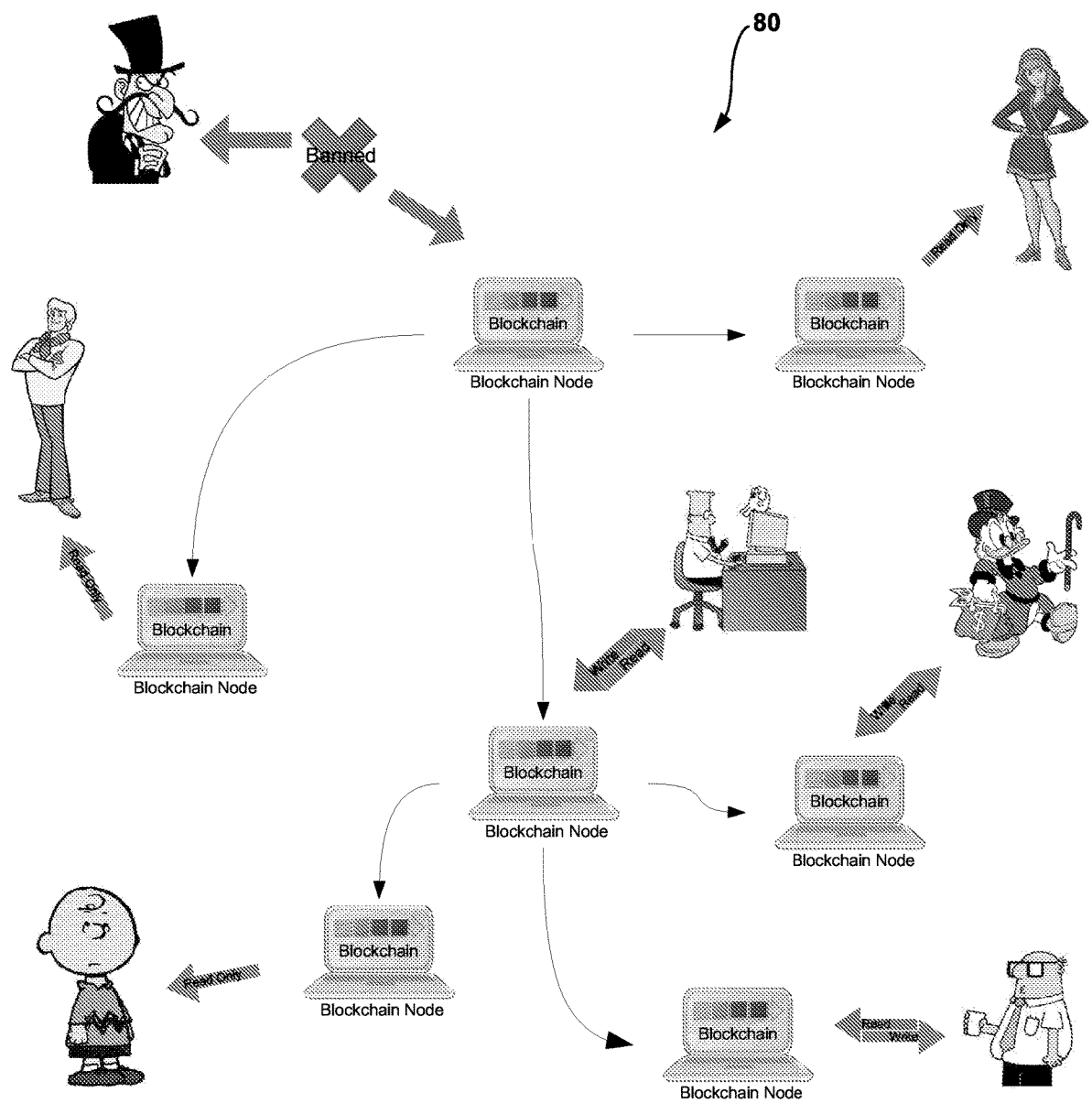
FIG. 15 is a schematic representation of a permissioned blockchain.

FIGS. 14 and 15 discuss permissionless and permissioned blockchains, respectively.

Permissionless blockchains allow any user to pseudo-anonymously join a blockchain network (that is, to become "nodes" of the network) and do not restrict the rights of the nodes on the blockchain network.

Conversely, permissioned blockchains restrict access to certain nodes of the network and may also restrict the rights of those nodes on that network. The identities of the users of a permissioned blockchain are typically known to the other users of that permissioned blockchain.

A permissioned blockchain typically requires approval of its users to use the permissioned blockchain, whereas a permissionless blockchain typically lets most anyone participate in the system.

Similarities of permissionless and permissioned blockchains are:
- both are types of blockchain distributed ledgers, which means that there are multiple versions of the same data that are stored in different places and connected through a network;
- both of these blockchains are theoretically immutable, meaning that the data they store cannot be modified or altered without having sufficient power over the network; even if someone manages to take control, the blocks that are linked by cryptographic hashes will change if any data is altered;
- both permissionless and permissioned blockchains make use of consensus mechanisms, which implies that they have a way for multiple versions of the ledger to reach an agreement on what they must all look like.

Permissioned blockchains, also known as private blockchains, can be thought of as closed ecosystems that can only be accessed by those who are allowed access. Anyone who is interested in validating transactions or viewing data on the network needs to get approval from a central authority. This is useful for companies, banks, and institutions that comply with required regulations and are concerned about having complete control of their data. Hyperledger and Ripple are examples of permissioned blockchains.

Permissionless blockchains, also known as public blockchains, typically allow anyone to transact and join as a validator. The data on these blockchains are publicly available, and complete copies of the ledgers are stored across the world, which is what makes it hard to censor or hack these systems. Permissionless blockchains do not have individuals to control them. Users can remain relatively anonymous, as there is no need to identify the users to perform transactions. Popular permissionless blockchains are Bitcoin, Ethereum, Litecoin, Dash, and Monero.

FIG. 14 shows a permissionless blockchain network 78 that allows anyone to read blocks and make valid changes to a blockchain by adding blocks. Mining and proof of work are used to secure and protect public blockchains and assure that individuals are not able to fraudulently alter the blockchain.

FIG. 15 shows a permissioned blockchain network 80, which allows some users complete read-write access, other users have read-only access, yet other users have access to some data, with nonusers completely barred.

Figure 17:
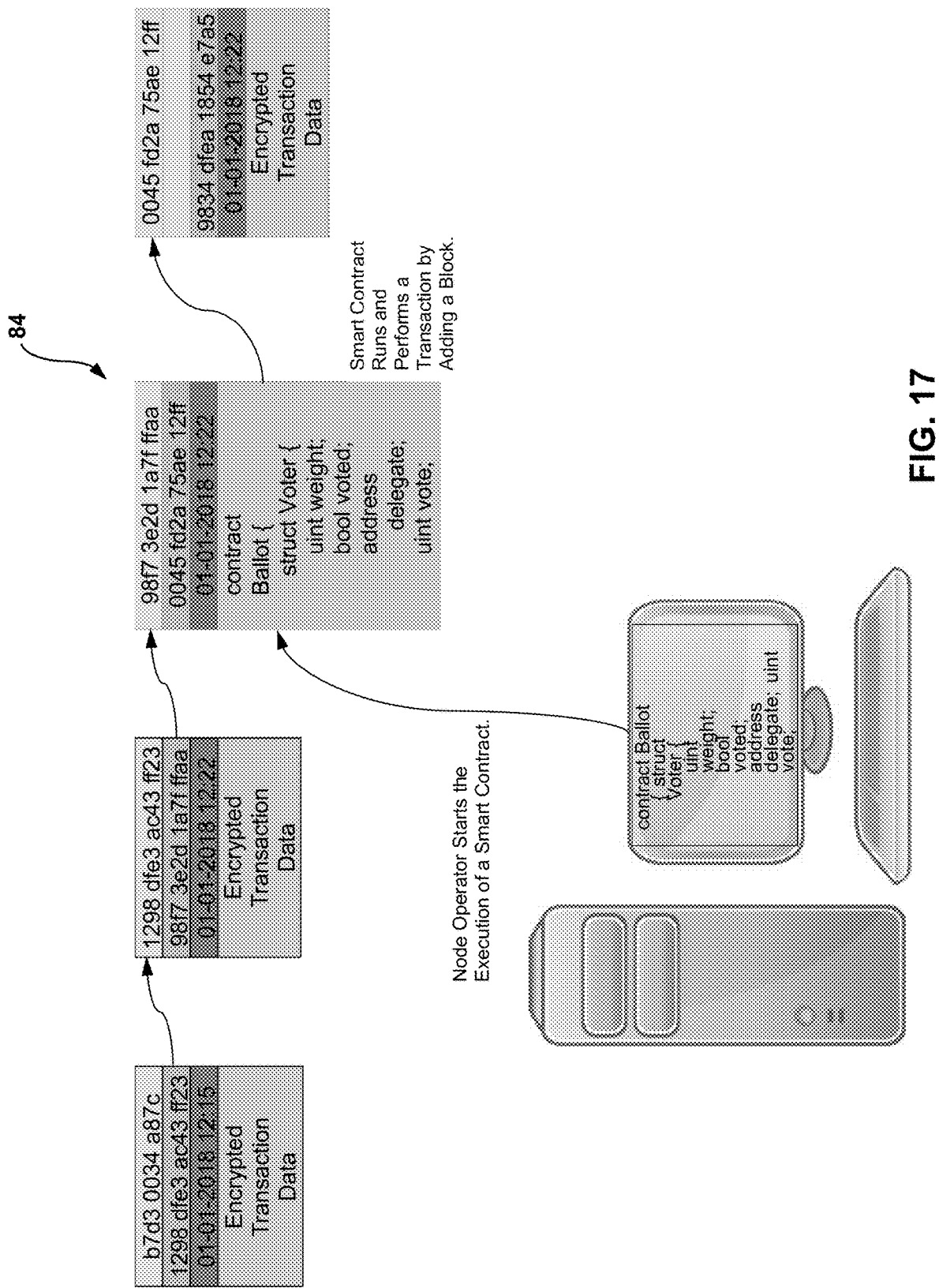
FIG. 17 is a schematic representation showing that smart contracts can perform transactions by adding blocks to the blockchain.
Figure 18:
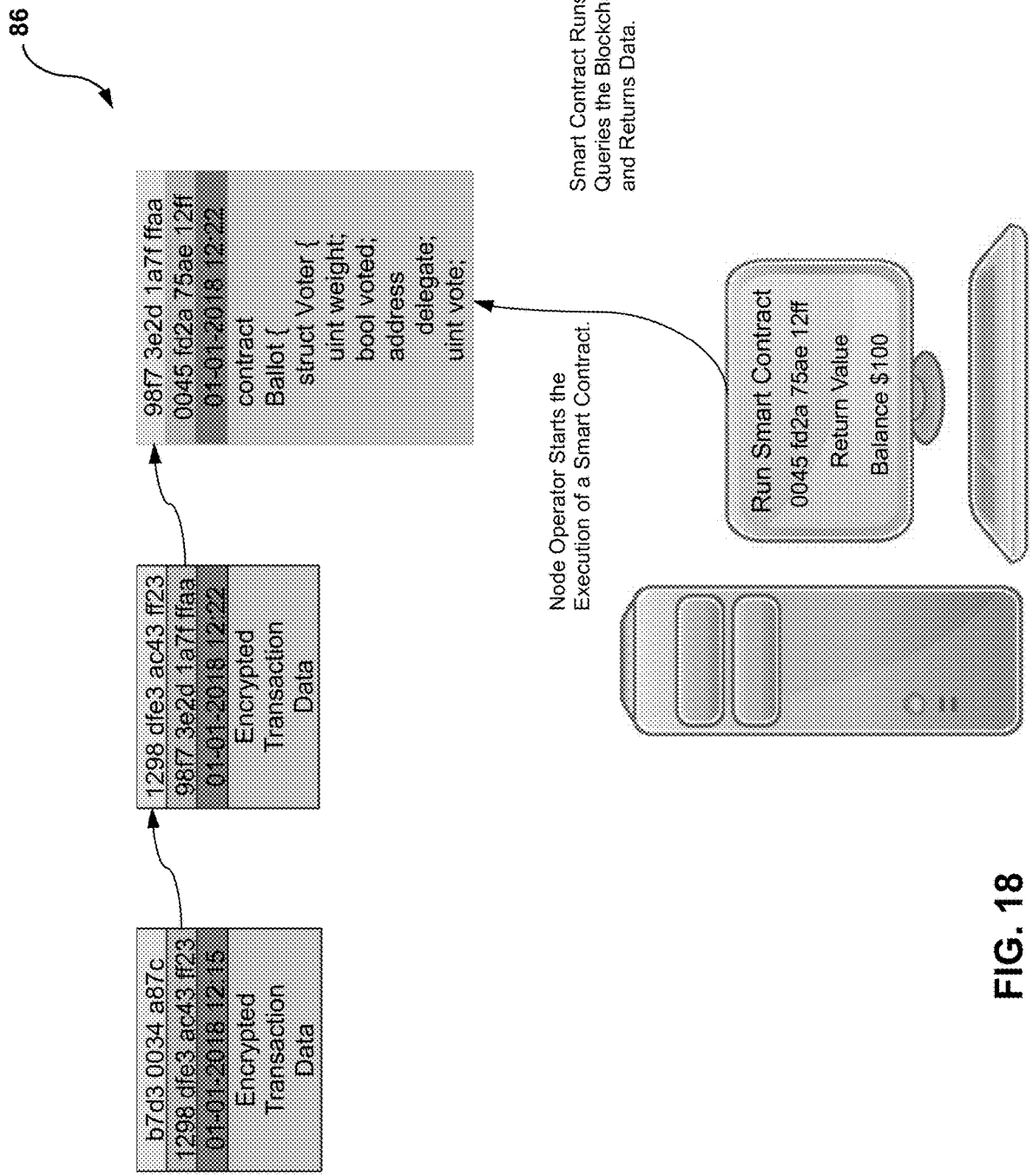
FIG. 18 is a schematic representation showing that smart contracts can query a blockchain and return data.

FIGS. 16-18 show that a blockchain is programmable.

FIG. 16 shows that a blockchain is programmable 82. To get the benefits of blockchain, programmability is necessary. There are many types of transactions that can be written to the blockchain with full programmability. In fact, it is completely up to the user. Users can create their own types of transactions that correspond to programs, which are called smart contracts and chain code. Smart contacts are software programs that run on programmable blockchains. These programs enable complex deals, ensuring, for example, that person "A" paid money, person "B" did his part, person "C" did her part, and everyone agrees. It is this level of flexibility that gives programmable blockchain its power, and enables us to realize the greatest benefits. The executable code resides in the transaction data part of the block.

Smart contracts are developed and tested locally on local machines and PC's. Once the smart contract is developed and debugged, it is sent to the blockchain.

FIG. 17 shows that smart contracts can perform transactions by adding blocks to a blockchain 84.

FIG. 18 shows that smart contracts can query a blockchain and return data 86.

FIGS. 19-22 show various systems and methods of blockchain distributed data storage.

Figure 19:
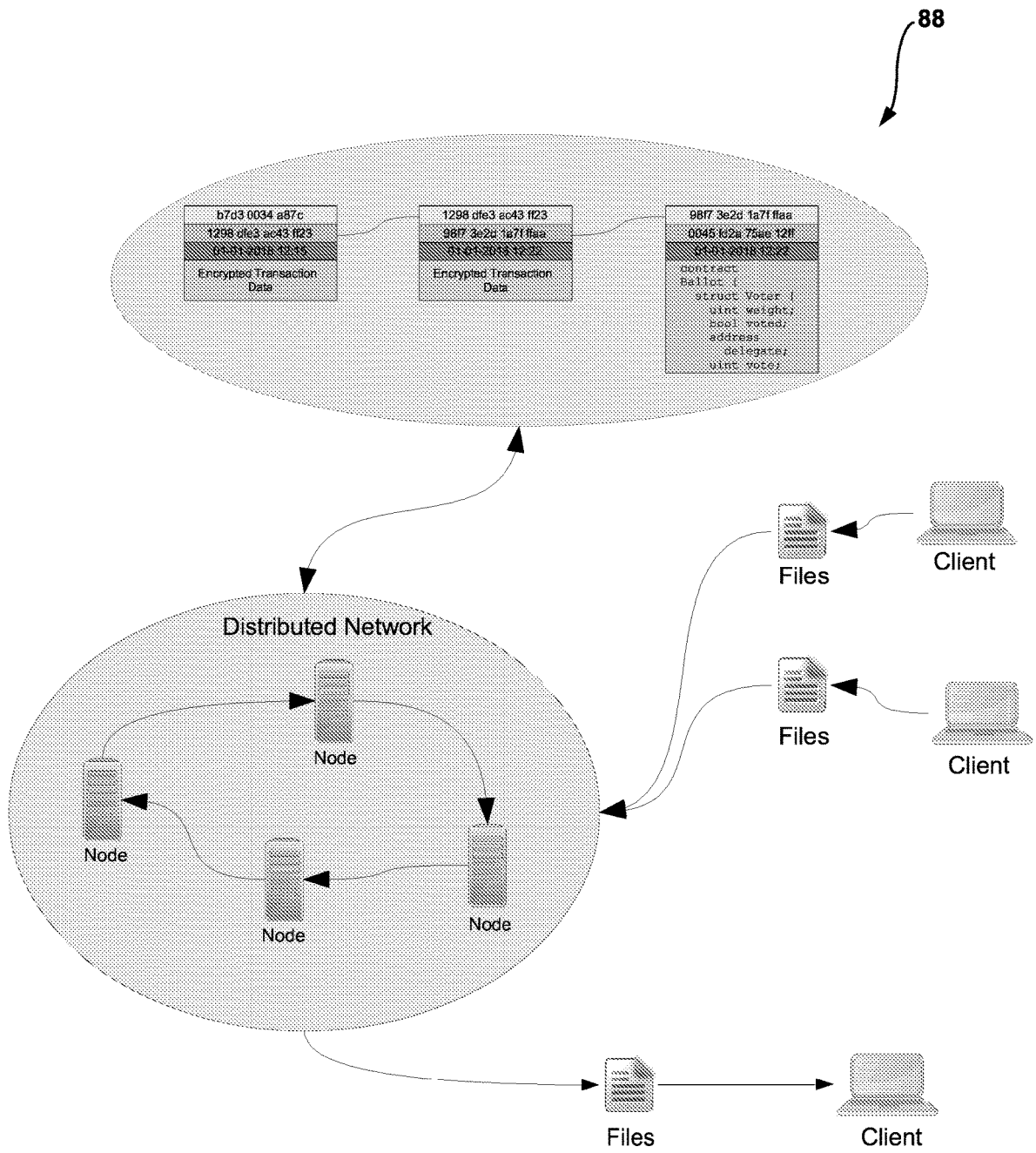
FIG. 19 is a schematic representation of distributed data storage of blockchain.

FIG. 19 is a schematic representation of distributed data storage on a blockchain 88. Although a blockchain is programmable, a network that includes distributed data processing, distributed data storage, and content distribution, as shown in FIG. 19, is preferable.

In more detail, a distributed data network having distributed data storage typically has no central repository of data.

The data are 'distributed', owing to the lack of centrality. A distributed storage infrastructure splits data across multiple physical servers, and often across more than one data center. The distributed data network that has a distributed storage system typically takes the form of a cluster of storage units, with a mechanism for data synchronization and coordination between cluster nodes.

The distributed network may be a swarm, such as, for example, a distributed network having a swarm protocol, or other suitable distributed network. Swarm is a system of peer-to-peer networked nodes that create a decentralized storage and communication service. The swarm system used for Ethereum blockchain, for example, is economically self-sustaining, owing to its built-in incentive system enforced through smart contracts on the Ethereum blockchain.

Although data processing, data storage, and content distribution could be accomplished using a server or a web server, such a system would be far less efficient and would take substantially more time to accomplish the same tasks as a distributed data network having distributed addressable data storage, which is preferable for use with the present invention.

Figure 20:
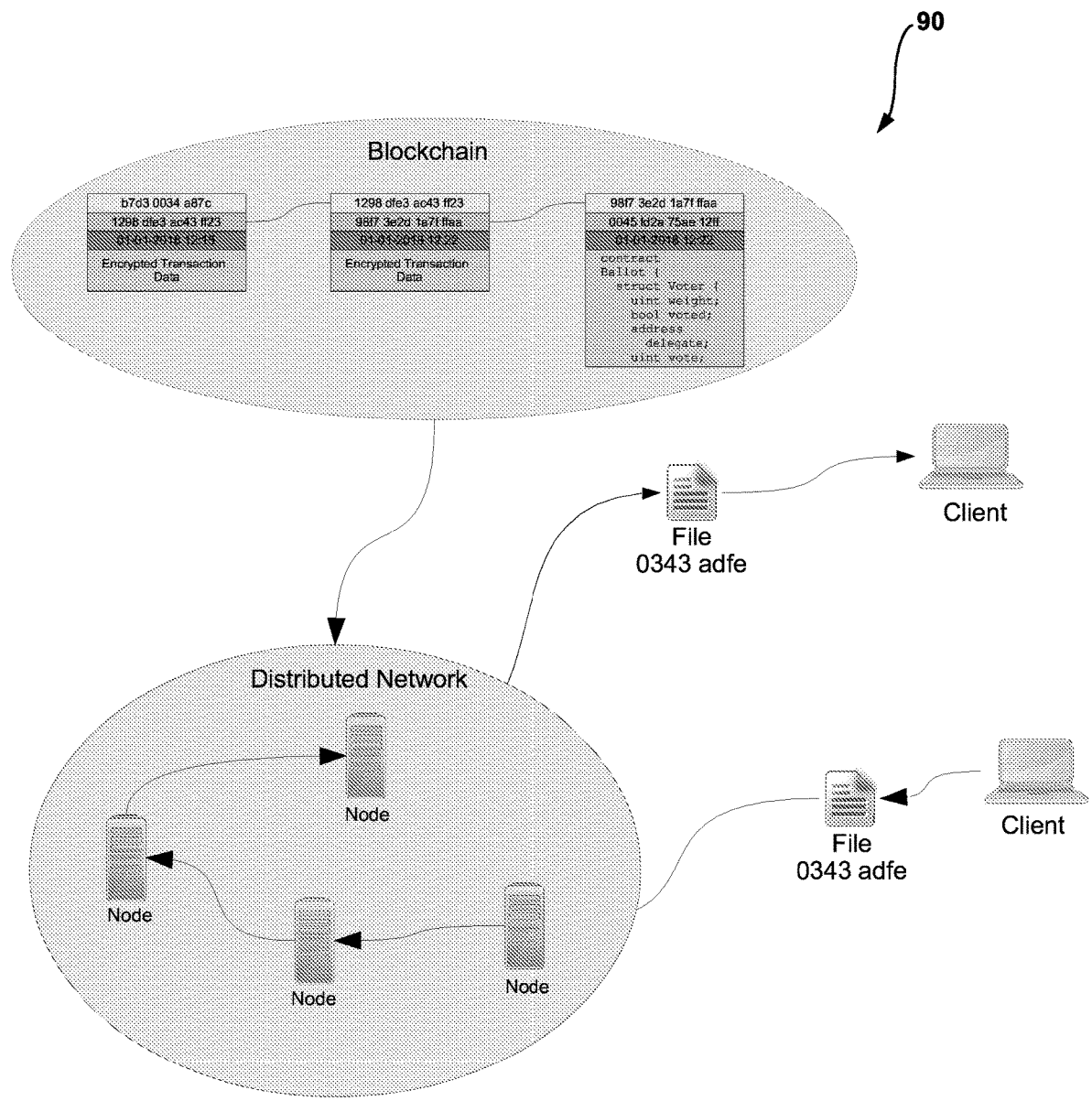
FIG. 20 is a schematic representation of a blockchain distributed data network having distributed data storage with hashed content and indexing.

FIG. 20 is a schematic representation of a blockchain distributed data network having distributed data storage with hashed content and indexing 90, which shows a distributed data network having distributed data storage in which files are addressed by the hashes of their contents.

Storage and retrieval of files on a distributed network having a distributed database, which are addressed by the hashes of their contents, improves efficiency, speed, security, and protection of the digital identity of talking heads and talking head shows.

FIG. 20 shows that files are addressed by the hashes of their contents, in accordance with the present invention. A swarm distributed network, using a swarm protocol, may be used to store and retrieve files addressed by the hashes of their contents. A system, such as BitTorrent, may optionally be used to allow an originating node to go offline and still allow content to be served. Distributed networks having distributed data storage that provide addressable substantially simultaneous file storage and addressable substantially simultaneous file retrieval are preferable for high throughput and efficiency.

Figure 21:
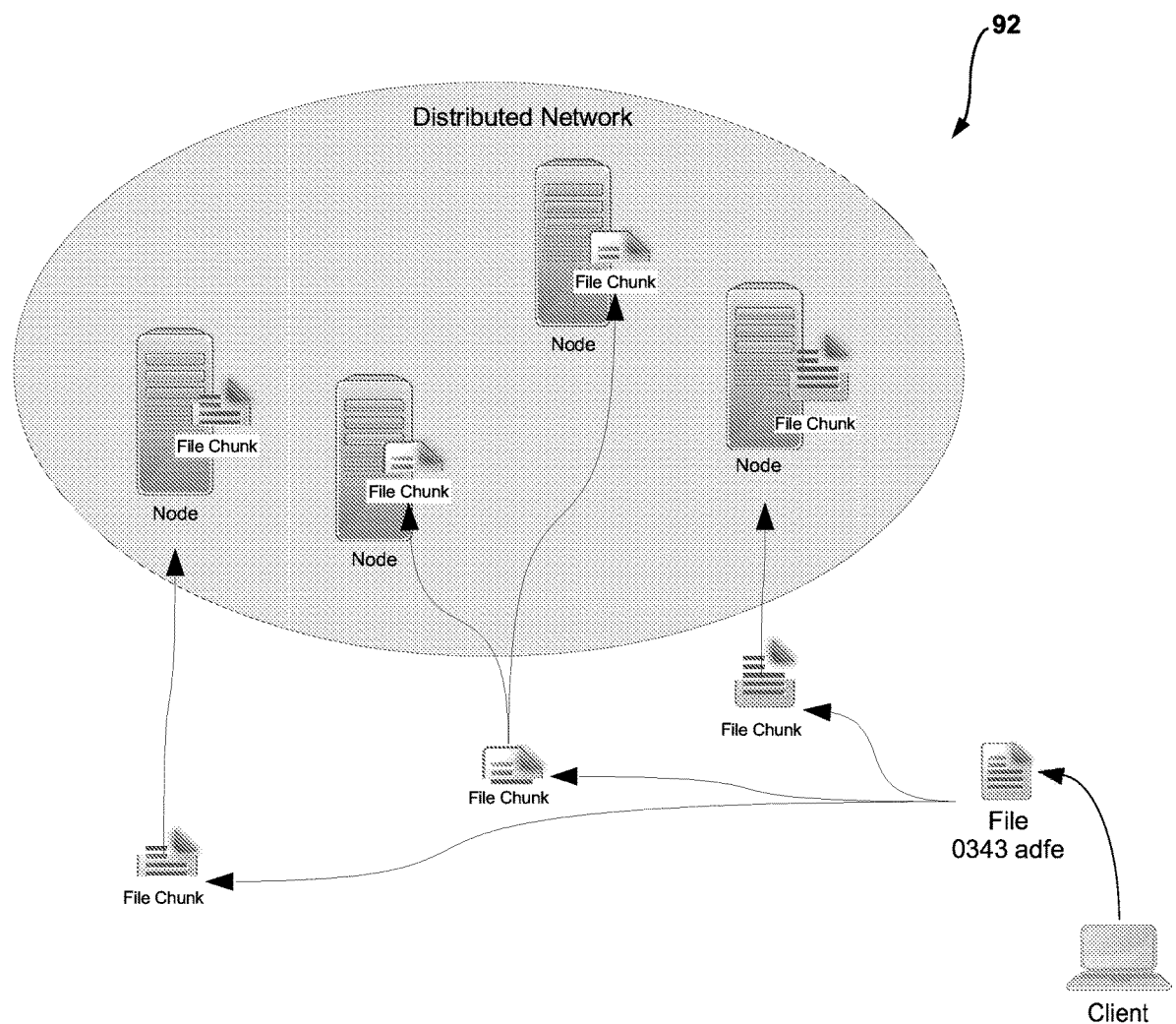
FIG. 21 is a schematic representation of a distributed data network showing chunked data storage on the distributed network.

FIG. 21 is a schematic representation of a distributed data network showing chunked data storage on the distributed network 92. FIG. 21 shows that files are divided into data elements called "chunks" and stored in nodes of the distributed network. A hash is computed for each data element or "chunk", and then each hashed data element or "chunk" is uploaded to nodes on the distributed network. The distributed network may be a Swarm network, Ethereum, or other suitable network.

Figure 22:
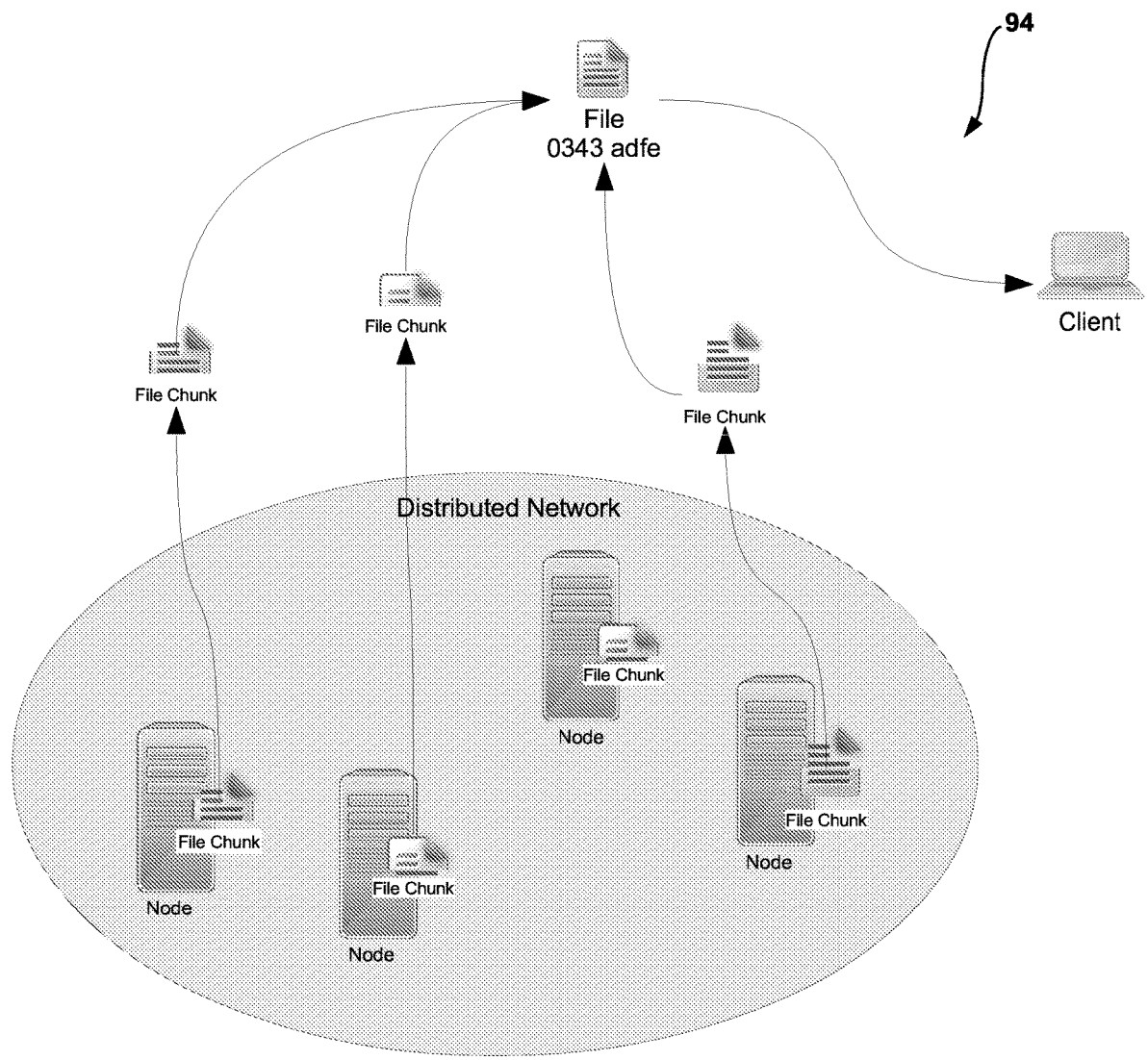
FIG. 22 is a schematic representation showing retrieval of chunked data from the distributed network of FIG. 21.

FIG. 22 is a schematic representation showing chunked data retrieval 94 from the nodes of the distributed network, previously shown in FIG. 21. The hashed data elements, or hashed chunks, are downloaded from the nodes of the distributed network and reconstructed into files having the same attributes as the originally uploaded files.

Figure 23:
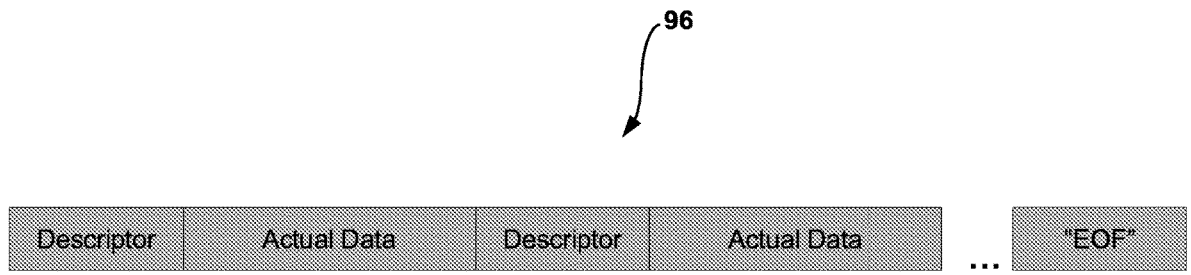
FIG. 23 is a schematic representation of a specially formatted talking head show file.

FIG. 23 is a schematic representation, which shows the format and syntax of descriptors of a specially formatted talking head show file 96. FIG. 23 shows descriptors that are incorporated into the specially formatted file. Each descriptor is shown as a string of variable length having a format, comprising: length of file|file name|additional data||. The length of file, file name, and additional data in each of the descriptors are separated with a pipe character, and each descriptor is terminated with a double pipe characters, as shown.

Figure 24:
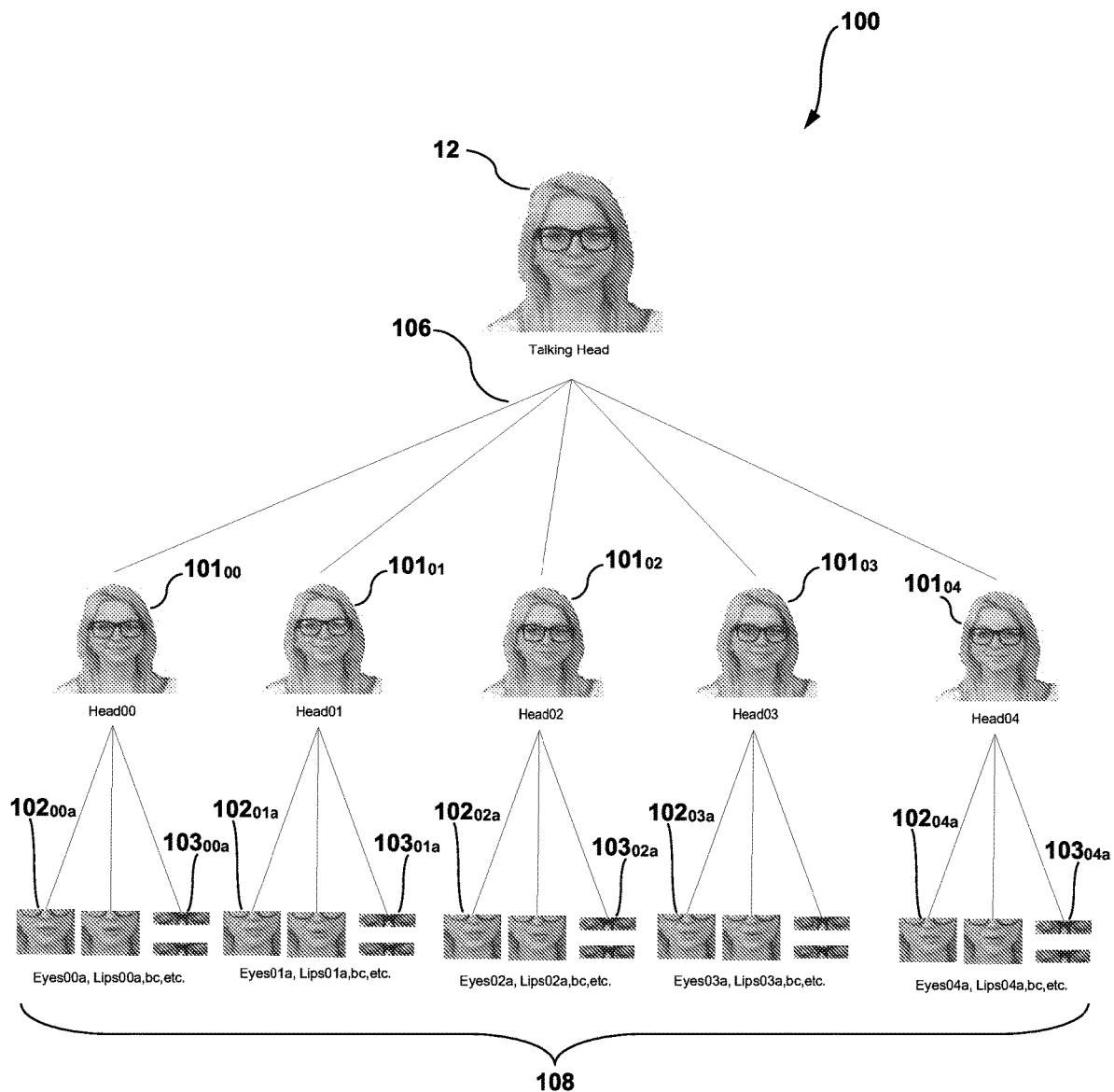
FIG. 24 is a schematic representation of a talking head, which is shown as a bitmap stack.

FIG. 24 is a schematic representation of a talking head 12, which is shown as a bitmap stack 100, comprising different head bitmaps, which follow the format and syntax $101_{00}$, $101_{01}$, $101_{02}$, $101_{03}$, and $101_{04}$, and so on, each of which have different lip bitmaps, which follow the format and syntax $102_{00a}$, $102_{01a}$, $102_{02a}$, $102_{03a}$, and $102_{04a}$, and so on, respectively, and different eye bitmaps which follow the format and syntax $103_{00a}$, $103_{01a}$, $103_{02a}$, $103_{03a}$, and $103_{04a}$, and so on, respectively, the structure of which is similar to a tree 106, all stored in a talking head specially formatted file 108.

A talking head 12, then, comprises a bitmap stack 100, comprising different head bitmaps, which follow the format and syntax $101_{00}$, $101_{01}$, $101_{02}$, $101_{03}$, and $101_{04}$, and so on, each of which have different lip bitmaps, which follow the format and syntax $102_{00a}$, $102_{01a}$, $102_{02a}$, $102_{03a}$, and $102_{04a}$, and so on, respectively, and different eye bitmaps which follow the format and syntax $103_{00a}$, $103_{01a}$, $103_{02a}$, $103_{03a}$, and $103_{04a}$, and so on, respectively, the structure of which is similar to a tree 106, all stored in a talking head specially formatted file 108. Metadata is also stored in the specially formatted file. In this instance, the specially formatted file is named a vsar file, although other suitable file names may be used.

Figure 25:
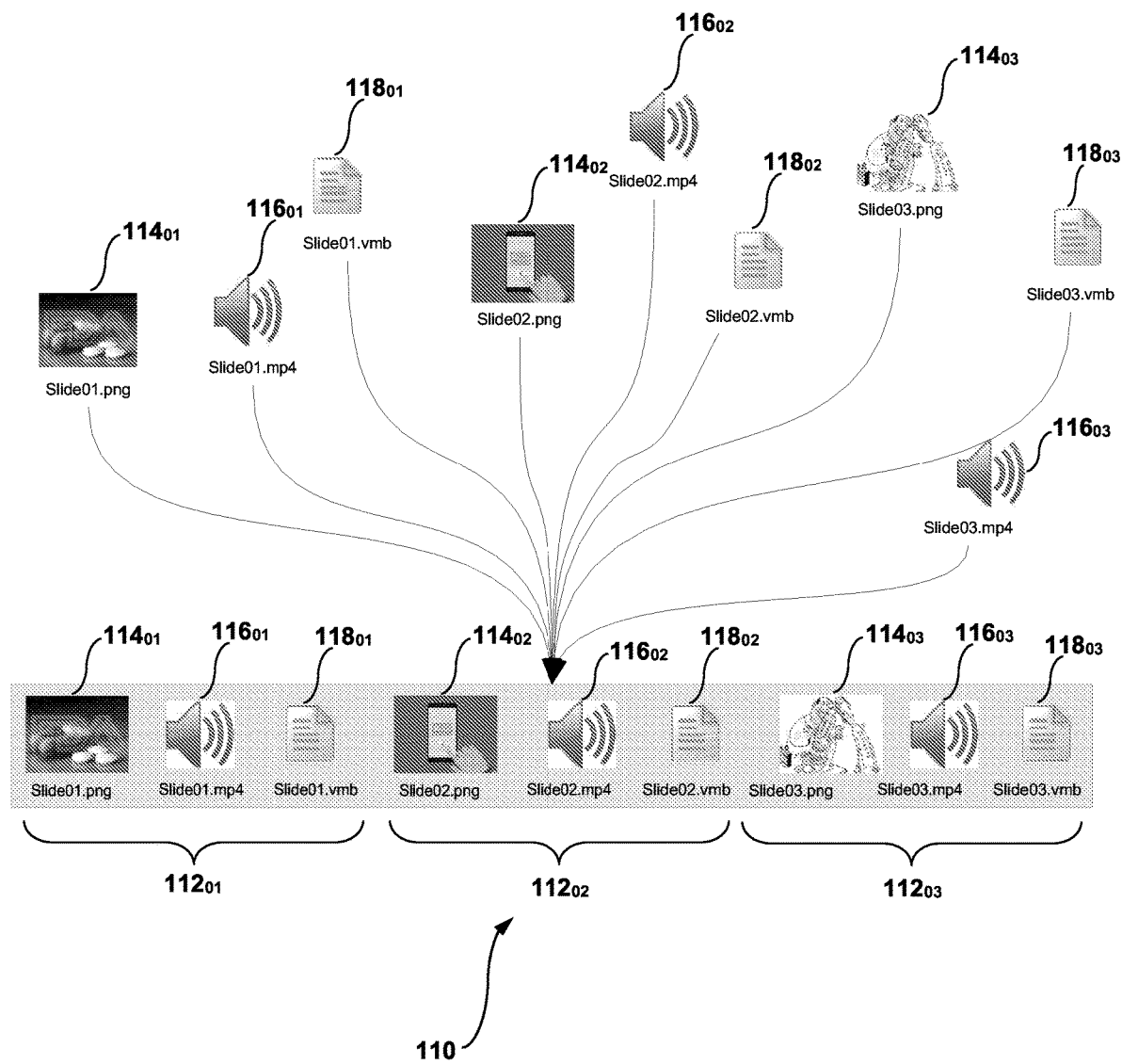
FIG. 25 is a schematic representation showing contents of a specially formatted file for storing talking heads and talking head shows.

FIG. 25 is a schematic representation showing contents of a talking head show specially formatted file 110, constructed in accordance with the present invention, the format of which may be used for storing talking head and talking head show files 20 and 21, respectively. The talking head show specially formatted file 110 is shown as a vsar file in which all files associated with a talking head show 14 are incorporated into one file having both header and metadata information, although any other suitable file name may be used having the aforementioned attributes.

The format of the talking head show specially formatted file 110 may be used to store talking head files 20, shown in FIG. 24 as a talking head specially formatted file 108, and/or talking head show files 21, shown in FIG. 25 as a talking head show specially formatted file 110.

Each talking head show specially formatted file 110 of FIG. 25 comprises a plurality of images and/or slide files, a plurality of audio files, and a plurality of header and/or metadata files, which follow the format and syntax $112_{01}$, $112_{02}$, and $112_{03}$, and so on, respectively; each of which comprises at least one image or slide file, which follow the format and syntax $114_{01}$, $114_{02}$, and $114_{03}$, and so on, respectively, a plurality of audio files, which follow the format and syntax $116_{01}$, $116_{02}$, and $116_{03}$, and so on, respectively, and a plurality of header and/or metadata files, which follow the format and syntax $118_{01}$, $118_{02}$, and $118_{03}$, and so on, respectively. Other suitable files may also be included. The talking head show specially formatted files 110 of FIG. 25 are typically retrieved sequentially; however, other suitable file retrieval methods may be used.

Figure 26:
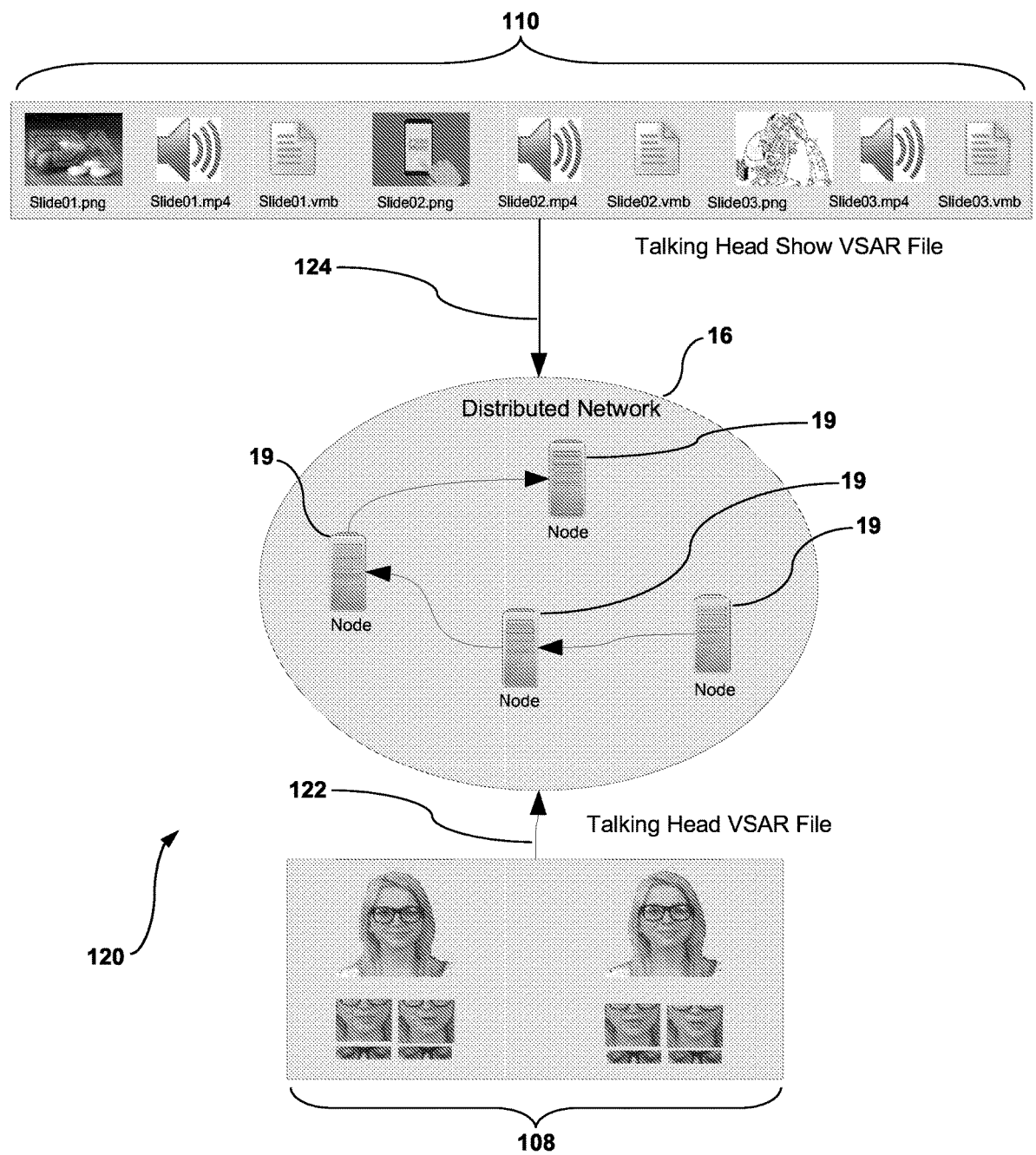
FIG. 26 is a schematic representation showing talking head and talking head show files uploaded to a peer to peer distributed network.

FIG. 26 is a schematic representation 120 showing specially formatted talking head and specially formatted talking head show files 108 and 110, respectively, uploaded 122 and 124, respectively, to a peer to peer distributed network 19. The peer to peer distributed network 19 may be a swarm network or other suitable network. The uploaded talking head and talking head show files comprise bitmaps of the talking head and the talking head show, which are uploaded in the specially formatted talking head and talking head show file format of FIG. 23, although another suitable file format may be used.

Figure 27:
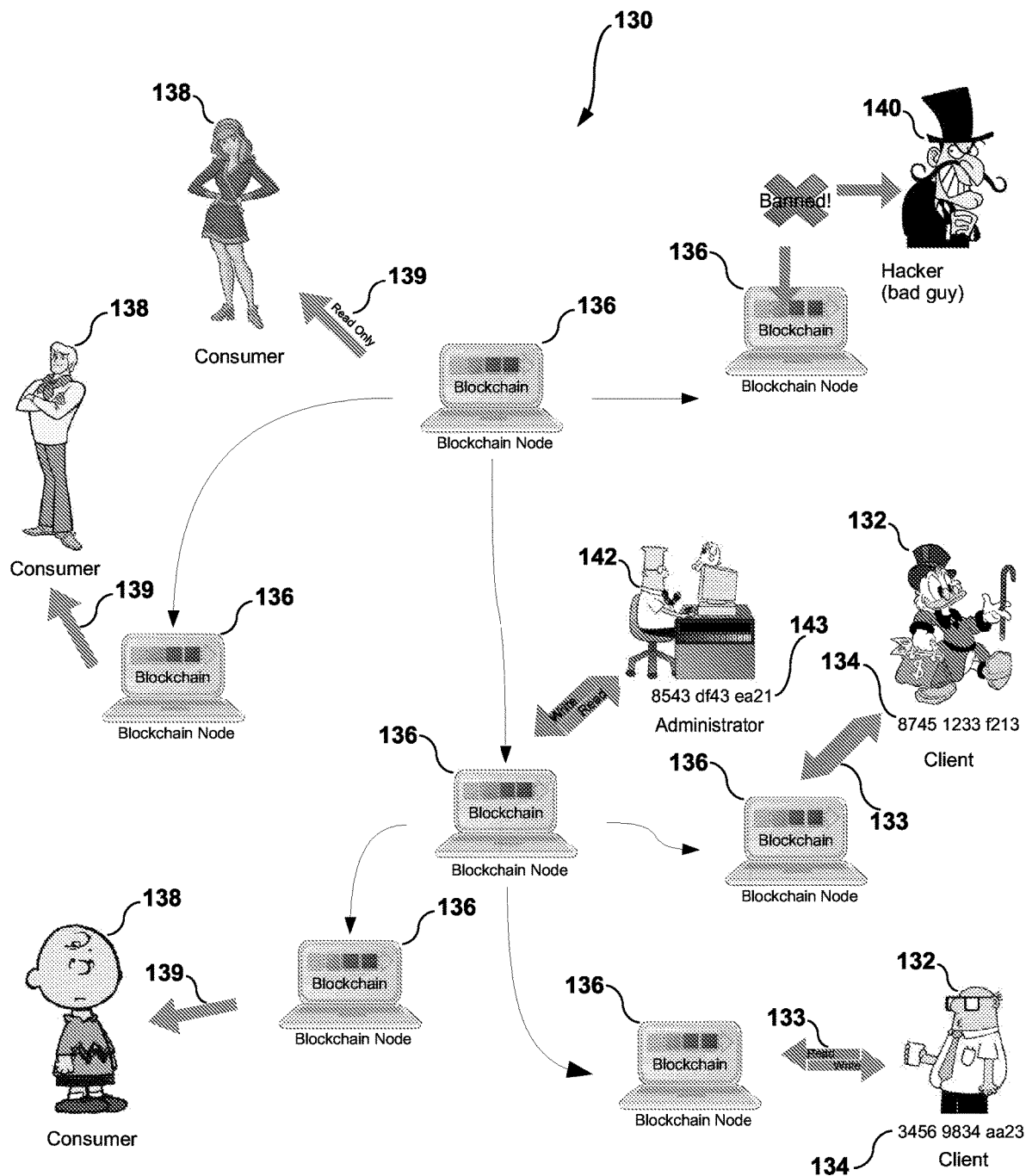
FIG. 27 is a schematic representation showing users on a permissioned blockchain network of the present invention.

FIG. 27 is a schematic representation showing users on a permissioned blockchain network 130 of the present invention. Each of the users 132 that have read-write access 133 has a unique hash identification (hash ID) 134, which is unique to that user 132, and which is communicated to that user 132 via blockchain nodes 136. Each of the users 132 that have such a unique hash identification (hash ID) 134 is considered to be a trusted user. Other users 138 may be granted read only access 139 without the need for a hash identification (hash ID) 134. Alternatively, the other users 138 that have read only access 139 may be required to have a unique hash identification (hash ID) 134, which may be helpful for tracking purposes. Non permissioned users 140, on the other hand, are denied access. Unique hash identifications (hash ID's) 134 are issued by Administrator 142, shown in FIG. 27. Administrator 142 has his/or her unique hash identification 143.

Figure 28:
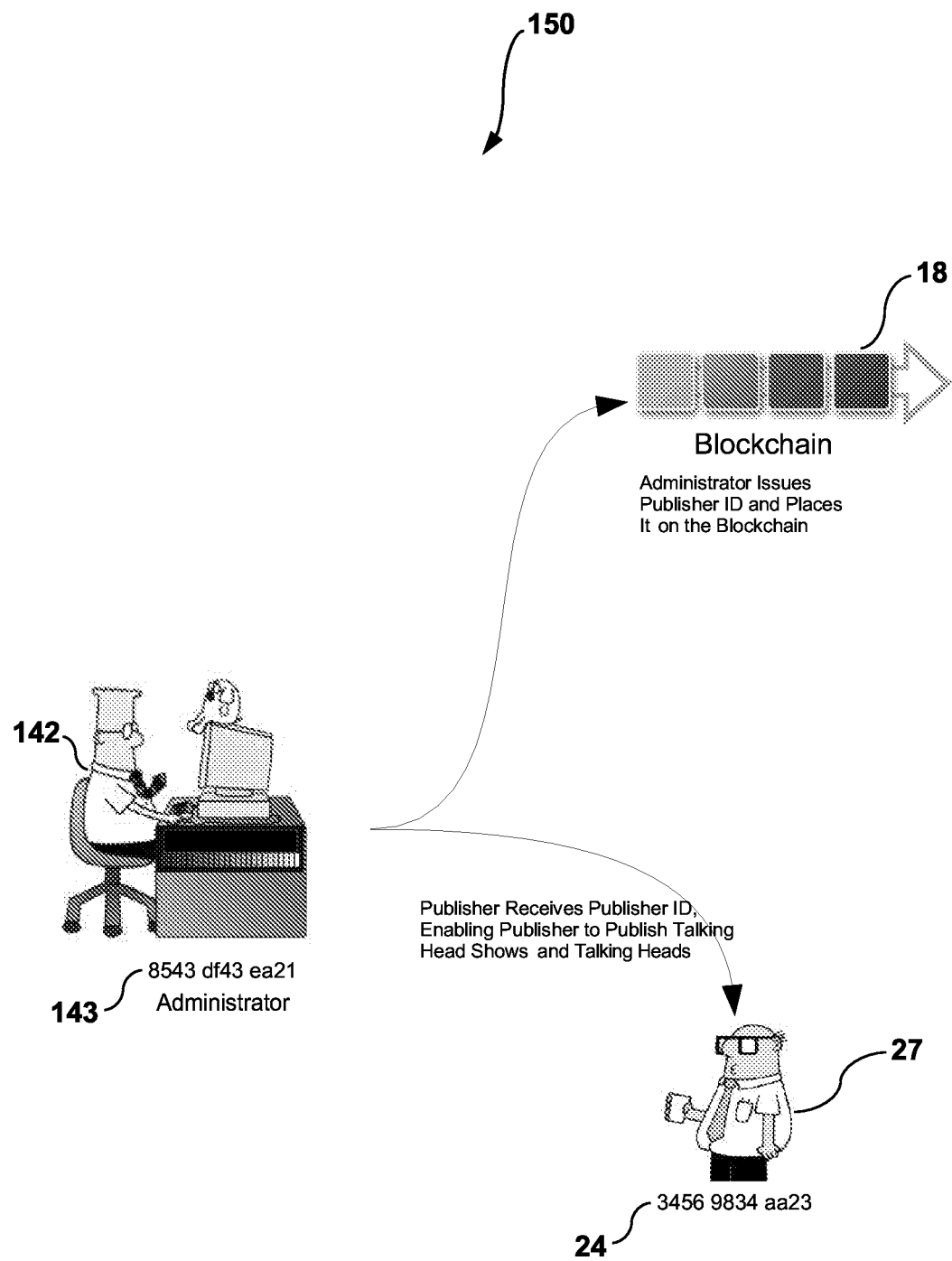
FIG. 28 is a schematic representation showing issuance of unique publisher hash identifications.

FIG. 28 is a schematic representation showing issuance 150 of unique publisher hash identifications (publisher hash ID's) 24, enabling a publisher 27 to publish his/her own talking head shows 14 and/or talking heads 12.

Figure 29:
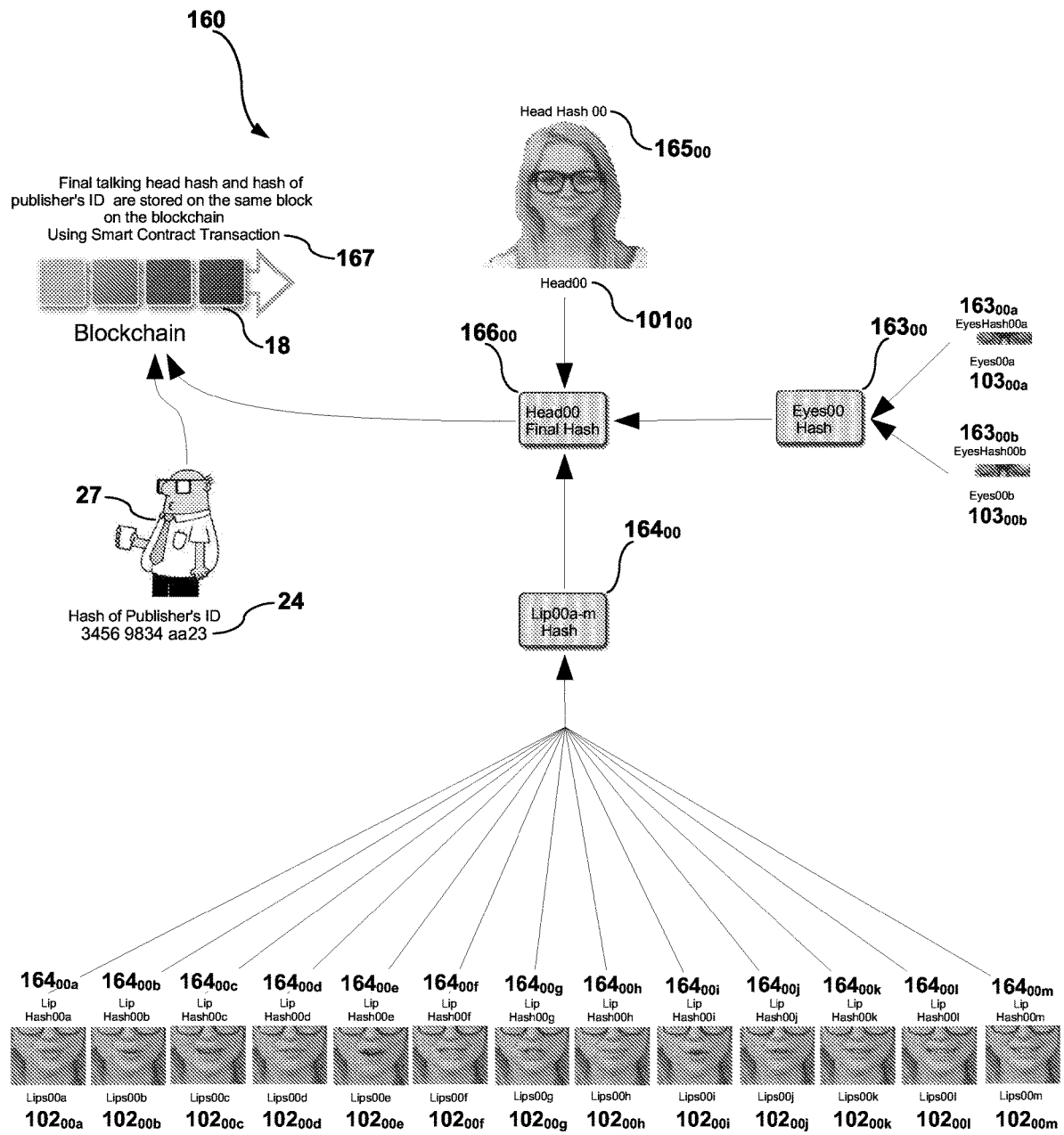
FIG. 29 is a schematic representation of a talking head Merkle tree hash of the present invention.

FIG. 29 is a schematic representation of a talking head Merkle tree hash 160 of the present invention.

As previously mentioned, and as shown in FIG. 24, a talking head 12 comprises a bitmap stack 100. Each talking head 12 comprises a bitmap stack 100, comprising different head bitmaps, which follow the format and syntax $101_{00}$, $101_{01}$, $101_{02}$, $101_{03}$, and $101_{04}$, and so on, each of which have different lip bitmaps, which follow the format and syntax $102_{00a}$, $102_{01a}$, $102_{02a}$, $102_{03a}$, and $102_{04a}$, and so on, respectively, and different eye bitmaps which follow the format and syntax $103_{00a}$, $103_{01a}$, $103_{02a}$, $103_{03a}$, and $103_{04a}$, and so on, respectively, the structure of which is similar to a tree 106, all stored in a talking head specially formatted file 108, such as a vsar file or other suitable file. Metadata is also stored in the talking head specially formatted file 108. In this instance, the specially formatted file is named a vsar file, although other suitable file names may be used.

A unique talking head Merkle tree hash 160 is calculated, using the bitmap stack 100, as follows:

hashes $163_{00a}$, $163_{01a}$, $163_{02a}$, $163_{03a}$, and $163_{04a}$, and so on, respectively, are calculated for each eye bitmap $103_{00a}$, $103_{01a}$, $103_{02a}$, $103_{03a}$, and $103_{04a}$, and so on, respectively, each of which is combined into an eye bitmap hash $163_{00}$;

hashes $164_{00a}$, $164_{01a}$, $164_{02a}$, $164_{03a}$, and $164_{04a}$, and so on, respectively, are calculated for each lip bitmap $102_{00a}$, $102_{01a}$, $102_{02a}$, $102_{03a}$, and $102_{04a}$, and so on, respectively, each of which is combined into a lip bitmap hash $164_{00}$;

hashes $165_{00}$, $165_{01}$, $165_{02}$, $165_{03}$, and $165_{04}$, and so on, respectively, are calculated for each head bitmap $101_{00}$, $101_{01}$, $101_{02}$, $101_{03}$, and $101_{04}$, and so on, respectively, each of which is combined into a head bitmap hash $165_{00}$;

the eye bitmap hash $163_{00}$, the lip bitmap hash $164_{00}$, and the head bitmap hash $165_{00}$, are each combined into a final head hash $166_{00}$.

The final head hash $166_{00}$ and the hash 24 of the publisher's identification 26 are stored on a blockchain 18 with a smart contract transaction 167, with each head hash having one blockchain entry per head bitmap.

Figure 30:
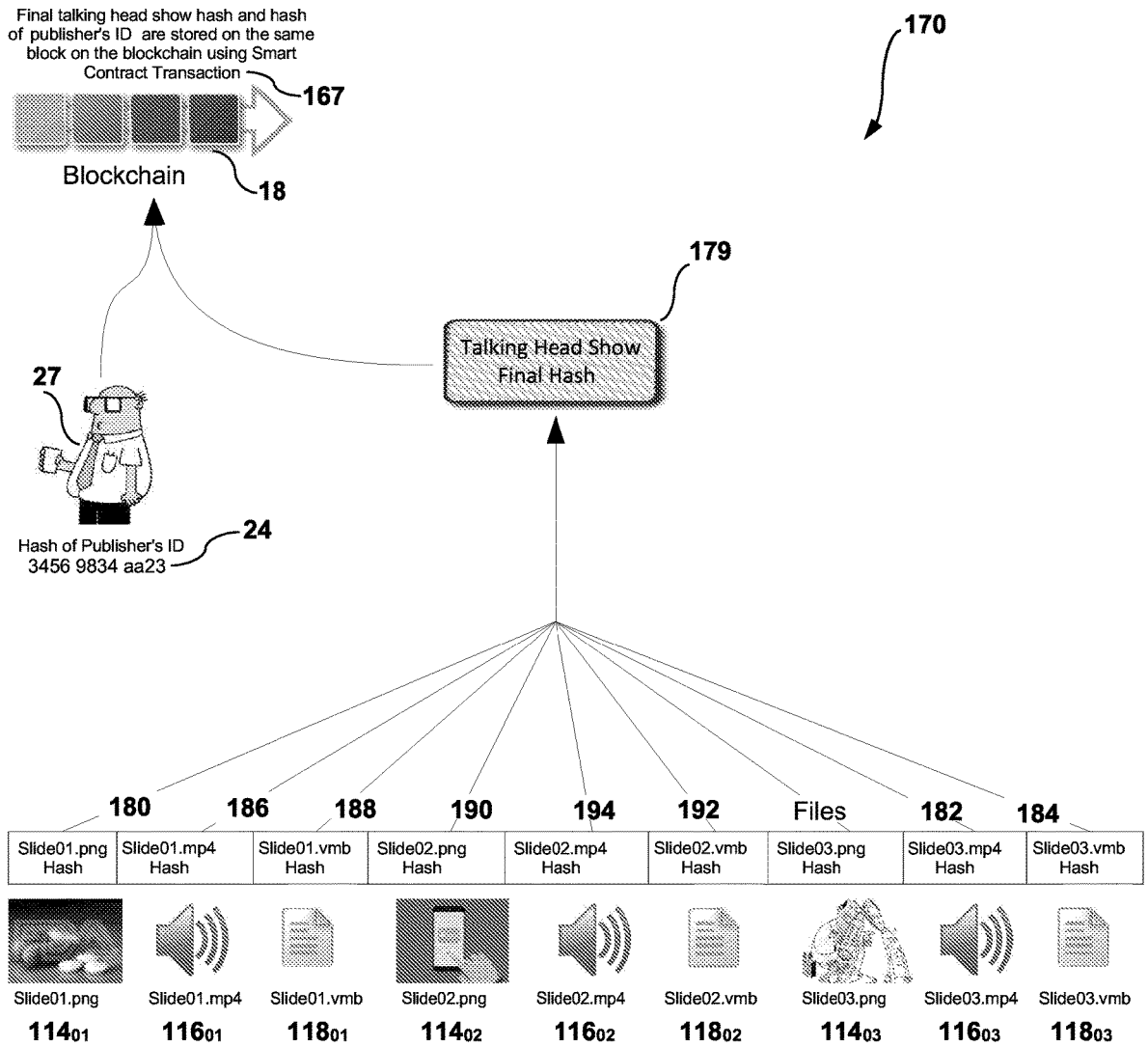
FIG. 30 is a schematic representation of a process for incorporating a talking head show into a final hash and incorporating the final hash into the blockchain, in accordance with the present invention.

FIG. 30 is a schematic representation of a process for incorporating a talking head show into a talking head show final hash and incorporating the talking head show final hash into the blockchain 170, in accordance with the present invention. Again, a talking head show has a plurality of talking heads, each being different from the other.

The talking head show typically comprises a variety of different media files in addition to the talking heads, including, lip sync data, photos, slides, music, and movie files, stored in the specially formatted file of the present invention, which are hashed into hashed lip sync data, hashed photos, hashed slides, hashed music files, and hashed movie files, as shown in FIG. 26, to create a final show hash. The final talking head show hash is stored in the blockchain with a smart contract transaction for use with the final talking head hash.

As previously mentioned, and shown in FIG. 25, each talking head show specially formatted file 110 of FIG. 25 comprises a plurality of images and/or slide files, a plurality of audio files, and a plurality of header and/or metadata files, which follow the format and syntax $112_{01}$, $112_{02}$, and $112_{03}$, and so on, respectively; each of which comprises at least one image or slide file, which follow the format and syntax $114_{01}$, $114_{02}$, and $114_{03}$, and so on, respectively, a plurality of audio files, which follow the format and syntax $116_{01}$, $116_{02}$, and $116_{03}$, and so on, respectively, and a plurality of header and/or metadata files, which follow the format and syntax $118_{01}$, $118_{02}$, and $118_{03}$, and so on, respectively. Other suitable files may also be included. The talking head show specially formatted files 110 of FIG. 25 are typically retrieved sequentially; however, other suitable file retrieval methods may be used.

Other suitable files may also be included. The talking head show specially formatted files 110 of FIG. 25 are typically retrieved sequentially; however, other suitable file retrieval methods may be used. Other suitable files may also be included.

Each talking head show 14, then, comprises: a plurality of images and/or slide files $114_{01}$, $114_{02}$, and $114_{03}$, and so on respectively; a plurality of audio files $116_{01}$, $116_{02}$, and $116_{03}$, and so on, respectively; and a plurality of header and/or metadata files $118_{01}$, $118_{02}$, and $118_{03}$, and so on, respectively; each of which is hashed, as shown in FIG. 30, into hashed images and/or slide files $174_{01}$, $174_{02}$, and $174_{03}$, and so on respectively, hashed audio files $176_{01}$, $176_{02}$, and $176_{03}$, and so on respectively, and hashed header and/or metadata files $178_{01}$, $178_{02}$, and $178_{03}$, and so on respectively, Each of the hashed images and/or slide files $174_{01}$, $174_{02}$, and $174_{03}$, and so on respectively, hashed audio files $176_{01}$, $176_{02}$, and $176_{03}$, and so on respectively, and hashed header and/or metadata files $178_{01}$, $178_{02}$, and $178_{03}$, and so on respectively, are then combined into a talking head show hash 179.

The hash identification 24 of the publisher 27, or owner, and the final hash 179 of the talking head show 14 are then stored on the same block on the blockchain 18, using a Smart Contract Transaction 167.

Figure 31:
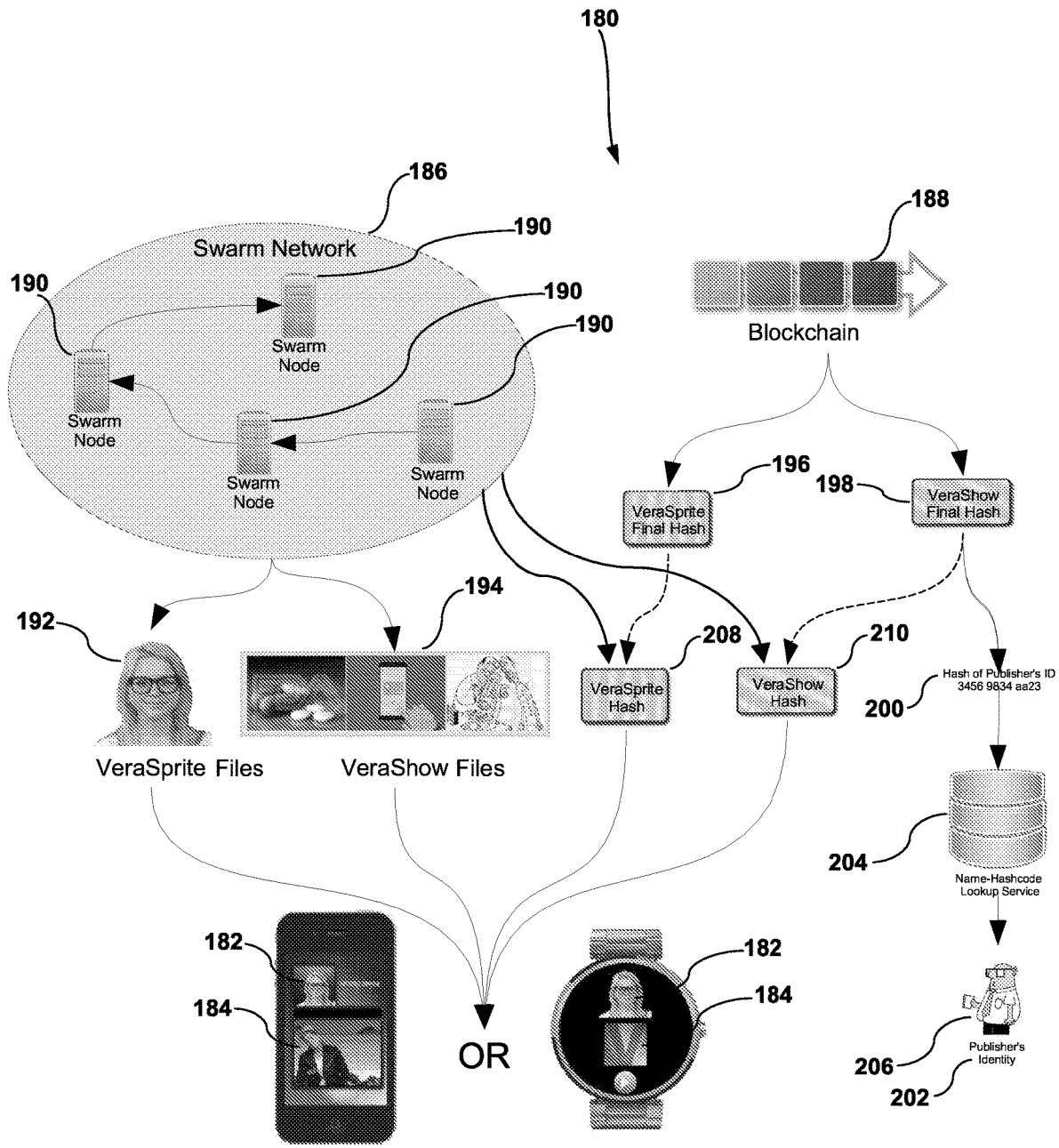
FIG. 31 shows an embodiment of the present invention, which uses the talking head digital identity immutable dual authentication system, method, and scheme of FIG. 1.

FIG. 31 shows an embodiment of the present invention 180, which uses the talking head digital identity immutable dual authentication system, method, and scheme of FIG. 1.

FIG. 31 shows particular examples of a talking head and talking head show, i.e., a VeraSprite™ talking head 182 and VeraShow talking head show 184, which are well suited for use in the talking head digital identity dual authentication system, method, and scheme on a distributed network 180, although any suitable talking head and/or talking head show may be used. FIG. 31 also shows the talking head digital identity dual authentication system, method, and scheme on a swarm distributed network 186, although any suitable distributed network may be used.

Again, the embodiment of the talking head digital identity dual authentication system and method on a distributed network 180 of the present invention is used for security and protection of the digital identity of talking heads 182 and talking head shows 184 on a distributed network 186 and protects the talking heads 182, talking head shows 184, and associated content from data loss, security breaches, malicious attacks, hacking, viruses, financial losses, and intellectual property theft. Talking head and talking head show security, publishing, verification, and playback are shown, using a blockchain 188, files stored on nodes 190 of the distributed network 186, and dual authentication.

The talking head digital identity immutable dual authentication system, method, and scheme 180 comprises: talking head 182 and talking head show 184 publishing, verification, and playback, using a blockchain 188, and dual authentication using cryptography.

Talking head files 192 and talking head show files 194 are downloaded from the nodes 190 of the distributed network 186, while the hash values 196 and 198 are downloaded from the blockchain 188. A hash 200 of a publisher's identification 202 is sent to a name lookup service 204 to retrieve and confirm the publisher 206 of the talking head 182 and talking head show 184. Hash values 208 and 210 of the talking head 182 and talking head show 184, respectively, are then calculated and compared to the hash values 196 and 198, respectively, retrieved from the blockchain 188.

If the hash values 196 and 198 received from the blockchain 188 match the calculated hash values 208 and 210 of the talking head 182 and talking head show 184, respectively, retrieved from the nodes 190 of the distributed network 186, then playback starts. Otherwise, playback does not start. This assures the integrity of the talking head 182 and talking head show 184, associated data and content, and the origin of the talking head 182 and talking head show 184.

The talking head 182 and talking head show 184 may be any suitable talking head and/or talking head show. It should be noted that both a VeraSprite™ talking head and/or VeraShow talking head show are well suited for use in the talking head digital identity dual authentication system, method, and scheme on a distributed network of FIG. 1, a particular embodiment 180 of which is shown in FIG. 31, although any suitable talking head and/or talking head show may be used on any suitable distributed network.

FIG. 31 shows that the VeraSprite™ talking head and the VeraShow talking head show files 192 and 194, respectively, are downloaded from the Swarm network 186, while the hash values of the VeraSprite™ talking head and the VeraShow talking head show files 182 and 184, respectively, are downloaded from the blockchain 188. The hash 200 of the publisher's identification 202 is sent to the name lookup service 204 to retrieve and confirm the publisher 206 of the VeraSprite™ talking head 182 and the VeraShow talking head show 184. The hash values of the VeraSprite™ talking head and the VeraShow talking head show 182 and 184, respectively, are recalculated and compared to the respective values 196 and 198 of each, respectively, retrieved from the blockchain 188.

If the respective recalculated hash values 208 and 210 of the VeraSprite™ talking head and the VeraShow talking head show files 182 and 184, respectively, match the respective values of the hash values 196 and 198 of the VeraSprite™ talking head and the VeraShow talking head show files 192 and 194, respectively, retrieved from the blockchain 188, playback starts, which ensures the integrity of the data and its origin. Otherwise, playback does not start.

Figure 32:
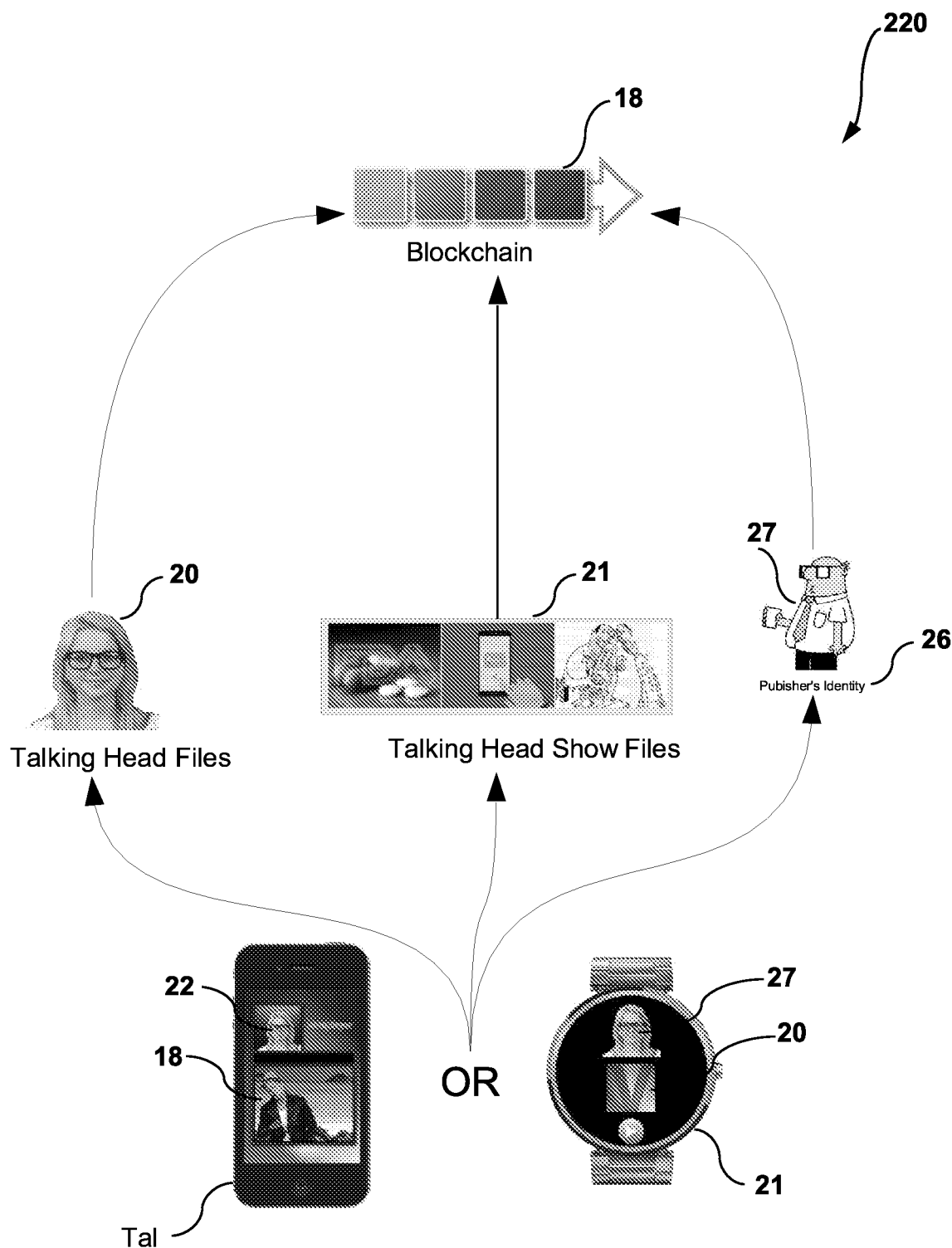
FIG. 32 is a schematic representation of talking head digital identity immutable blockchain verification analytics system and method.

FIG. 32 is a schematic representation of talking head digital identity immutable blockchain verification analytics system and method 220, using the publisher's identity 26 of the publisher 27 of the talking head 12 and the talking head show 14, each of which is known.

Again, a hash identifier 24 of the publisher's identification 26 of the publisher 27 of the talking head show 14 and the talking head 12 is sent from the blockchain 18 to a name lookup service 28, as previously shown in FIG. 1. The identity 26 of the publisher 27 of the talking head show 14 and the talking head 12 is retrieved and confirmed from the name look up service 28, which is also shown in FIG. 1.

The publisher's identity 26 of the publisher 27 of the talking head 12 and the talking head show 14 are known, as discussed above, and the talking head files 20 and the talking head show files 21 of the talking head 12 and talking head show 14, respectively, are also known, thus, enabling playback software on the mobile devices 222 and/or 224 to keep track of how often each talking head 12 is used and how often and when each talking head show 14 is played.

Metrics are, thus, provided that can be uploaded from the mobile devices 222 and/or 224 to the blockchain 18. Metrics uploaded to the blockchain 18 from the mobile devices 222 and/or 224 may then be used to track how often each talking head 12 is used and how often and when each talking head show 14 is played.

Figure 33:
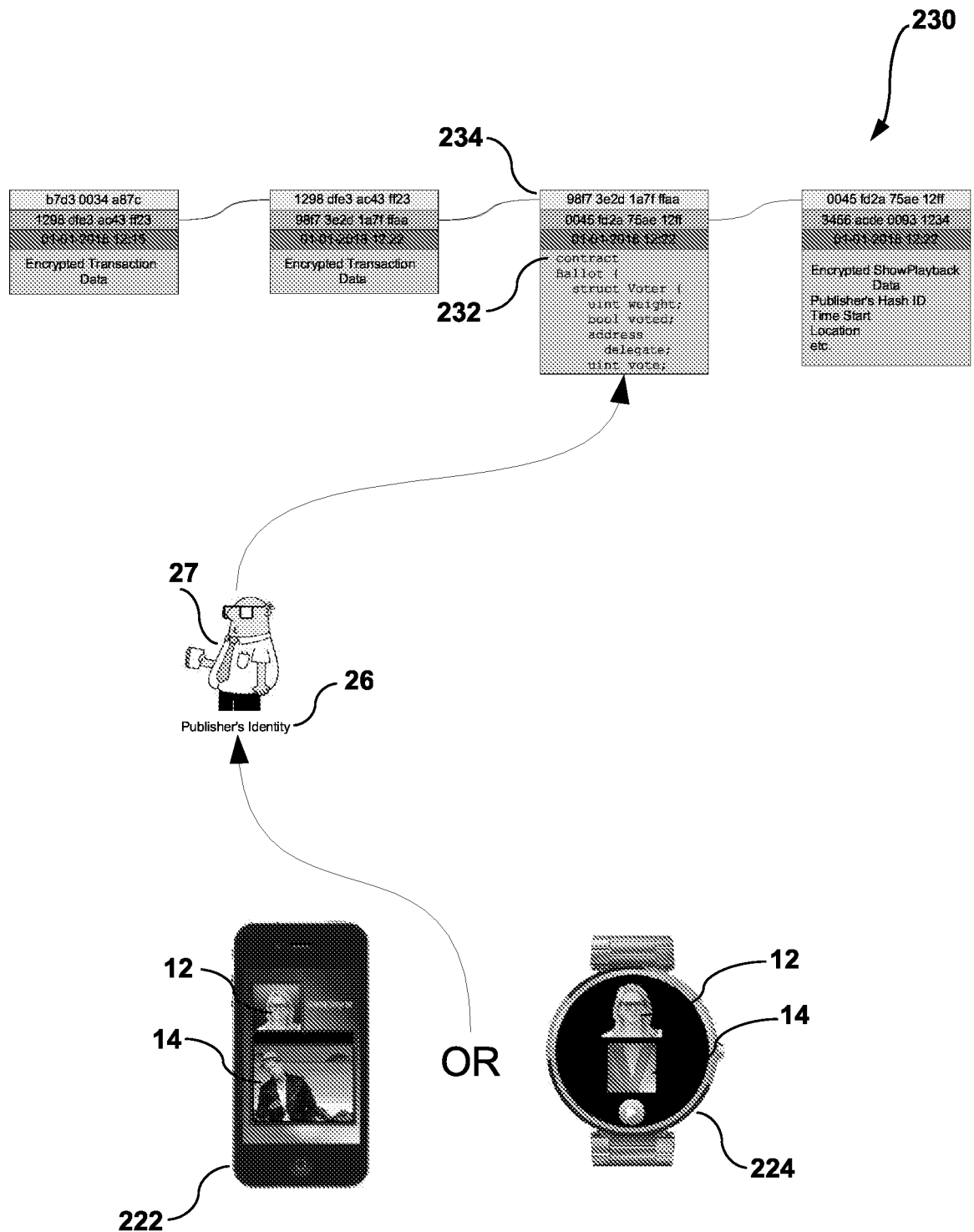
FIG. 33 is a schematic representation of another talking head digital identity immutable blockchain verification analytics system and method.

FIG. 33 is a schematic representation of another talking head digital identity immutable blockchain verification analytics system and method 230, which shows that each time a talking head show 14 is played, a smart contract 232 is triggered, and a hash identification 234, or hash identifier, of the publisher 27 is stored on the blockchain 18, each time that the talking head show 14 is played.

Again, a hash identifier, in this instance the hash identifier 234, of the publisher's identification 26 of the publisher 27 of the talking head show 14 and the talking head 12 is sent from the blockchain 18 to a name lookup service 28, as previously shown in FIG. 1. The identity 26 of the publisher 27 of the talking head show 14 and the talking head 12 is retrieved and confirmed from the name look up service 28, which is also shown in FIG. 1.

Thus, each time a talking head show 14 is played the hash identification 234, or hash identifier, of the publisher 27 is stored on the blockchain 18.

Figure 34:
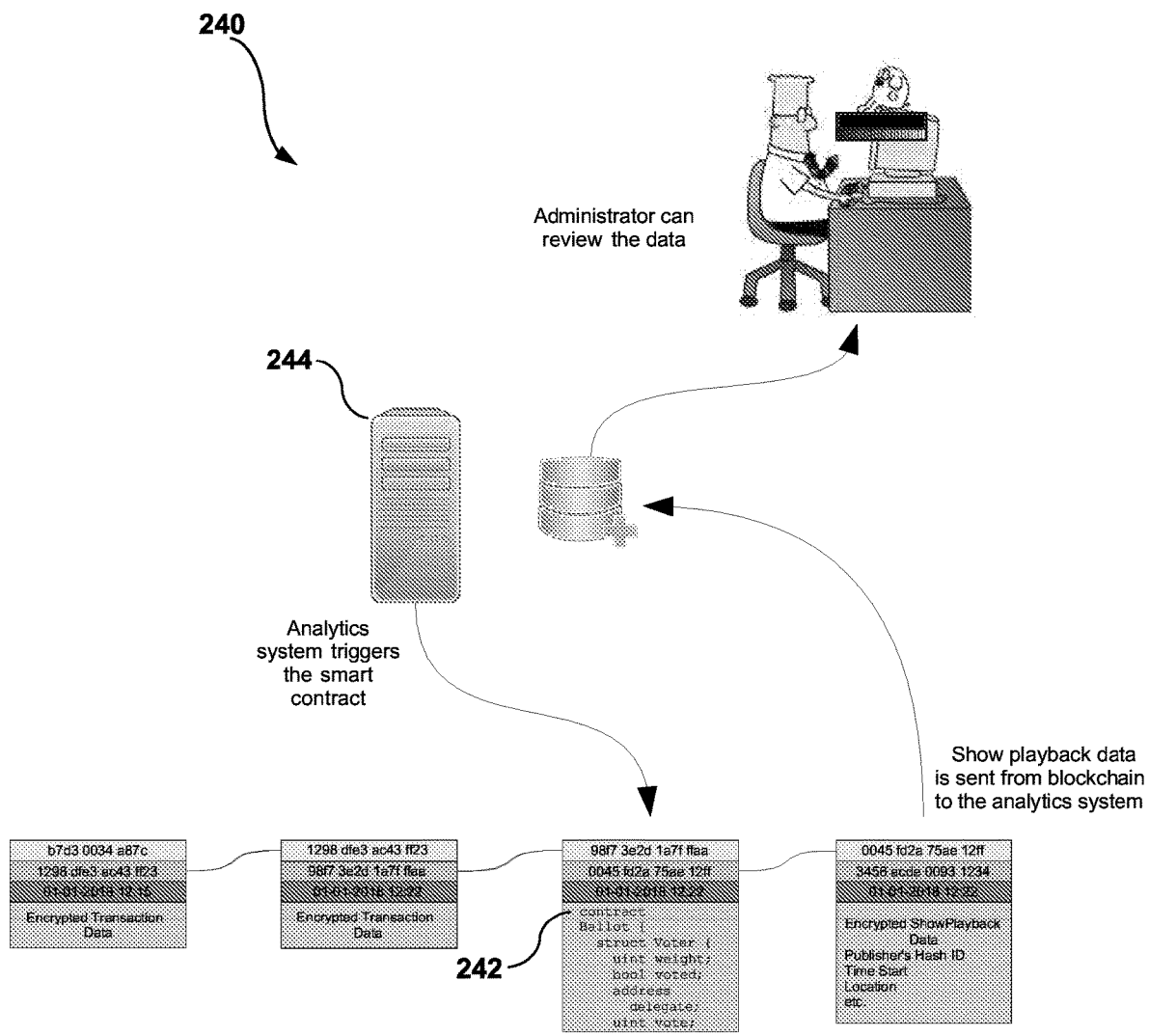
FIG. 34 is a schematic representation of another talking head digital identity immutable blockchain verification analytics system and method.

FIG. 34 is a schematic representation of another talking head digital identity immutable blockchain verification analytics system and method 240, which shows that once show playback data is on the blockchain 18, a smart contract 242 can be triggered by analytics system 244, which enables show playback data to be retrieved and analyzed. Thus, talking head show playback data can be retrieved and analyzed.

FIG. 35 is a schematic representation of features of immutable blockchain authentication schemes 250, which compares an immutable dual authentication scheme 252 and a distributed data network dual authentication scheme 254. In the immutable dual authentication scheme 252: hash codes reside on the blockchain; the talking head and the talking head show each reside on a web server; and publisher verification uses public and private keys. In the distributed data network dual authentication scheme 254: hash codes reside on the blockchain; the talking head and the talking head show each reside on a blockchain distributed network; and publisher verification uses a publisher code.

Although the present invention has been described in considerable detail with reference to certain preferred versions thereof, other versions are possible. Therefore, the spirit and scope of the appended claims should not be limited to the description of the preferred versions contained herein.

What is claimed is:

1. A talking head digital identity immutable dual authentication method for use over a distributed network, comprising:
   downloading talking head and talking head show files from nodes of a distributed network;
   downloading final hash values of a talking head and talking head show from a blockchain;
   recalculating hash values of the talking head and talking head show files, using unique bitmap stacks of the talking head and talking head show files,
      the recalculated hash values comprising Merkle Tree hash values of the talking head and talking head show;
   comparing the recalculated hash values of the talking head and the talking head show files with the hash values of the talking head and the talking head show retrieved from the blockchain;
   authenticating the talking head and talking head show files, if the recalculated hash values of the talking head and the talking head show retrieved from the nodes of the distributed network match the hash values received from the blockchain.

2. The talking head digital identity immutable dual authentication method for use over a distributed network according to claim 1, further comprising:
   sending a hash of a publisher's identification of the publisher of the talking head show and the talking head from the blockchain to a name lookup service;
   retrieving and confirming the identity of the publisher of the talking head show and the talking head from the name look up service;
      starting playback of the talking head show if the recalculated hash values of the talking head and the talking head show files retrieved from the nodes of the distributed network match the hash values received from the blockchain match;
      if the recalculated hash values of the talking head and the talking head show files retrieved from the nodes of the distributed network do not match the hash values received from the blockchain, then playback does not start.

3. The talking head digital identity immutable dual authentication method for use over a distributed network according to claim 1, wherein:
   the unique bitmap stacks of the talking head and talking head show files comprise head bitmaps, lip bitmaps, and eye bitmaps.

4. The talking head digital identity immutable dual authentication method for use over a distributed network according to claim 3, wherein:
   head bitmap hashes are calculated for the head bitmaps;
   lip bitmap hashes are calculated for the lip bitmaps;
   eye bitmap hashes are calculated for the eye bitmaps;
   the head bitmap hashes, the lip bitmap hashes, and the eye bitmap hashes are combined into a final head hash.

5. The talking head digital identity immutable dual authentication method for use over a distributed network according to claim 4, wherein:
   the final head hash is stored on the blockchain with a smart contract transaction.

6. The talking head digital identity immutable dual authentication method for use over a distributed network according to claim 1, further comprising:
   prior to downloading the talking head and talking head show files from the nodes of the distributed network and downloading the final hash values of the talking head and talking head show from the blockchain;
   calculating hash values of the talking head and talking head show files;
   uploading the talking head and the talking head show files to the distributed network;
   uploading the hash values of the talking head and talking head show files to the distributed network and the blockchain.

7. The talking head digital identity immutable dual authentication method for use over a distributed network according to claim 2, further comprising:
   prior to downloading the talking head and talking head show files from the nodes of the distributed network and downloading the final hash values of the talking head and talking head show from the blockchain;
   calculating hash values of the talking head and talking head show files;
   calculating a hash value of the publisher's identification;
   uploading the talking head and the talking head show files to the distributed network;
   uploading the hash values of the talking head and talking head show files to the distributed network and the blockchain;
   uploading the hash value of the publisher's identification to the blockchain.

8. The talking head digital identity immutable dual authentication method for use over a distributed network according to claim 7, wherein:
   the final head hash has one blockchain entry per head bitmap.

9. A talking head digital identity immutable dual authentication method for use over a distributed network, comprising:
   downloading talking head and talking head show files from nodes of a distributed network;
   downloading final hash values of a talking head and talking head show from a blockchain;
   sending a hash of a publisher's identification of the publisher of the talking head show and the talking head from the blockchain to a name lookup service;
   retrieving and confirming the identity of the publisher of the talking head show and the talking head from the name look up service;
   recalculating hash values of the talking head and talking head show files, using unique bitmap stacks of the talking head and talking head show files,
      the recalculated hash values comprising Merkle Tree hash values of the talking head and talking head show;
   comparing the recalculated hash values of the talking head and the talking head show with the hash values of the talking head and the talking head show retrieved from the blockchain;
   starting playback of the talking head show if the hash values received from the blockchain match the recalculated hash values of the talking head and the talking head show retrieved from the nodes of the distributed network.

10. The talking head digital identity immutable dual authentication method for use over a distributed network according to claim 9, wherein:

the unique bitmap stacks of the talking head and talking head show files comprise head bitmaps, lip bitmaps, and eye bitmaps.

11. The talking head digital identity immutable dual authentication method for use over a distributed network according to claim 10, wherein:

each head bitmap of the head bitmaps, each lip bitmap of the lip bitmaps, and each eye bitmap of the eye bitmaps are combined into a final head hash.

12. The talking head digital identity immutable dual authentication method for use over a distributed network according to claim 11, wherein:

the final head hash is stored on the blockchain with a smart contract transaction.

13. A talking head digital identity immutable dual authentication method for use over a distributed network, comprising:

downloading talking head and talking head show files from nodes of a distributed network;

downloading final hash values of a talking head and talking head show from a blockchain;

recalculating hash values of the talking head and talking head show files, using unique bitmap stacks of the talking head and talking head show files, the recalculated hash values comprising Merkle Tree hash values of the talking head and talking head show;

comparing the recalculated hash values of the talking head and the talking head show files with the hash values of the talking head and the talking head show retrieved from the blockchain;

authenticating the talking head and talking head show files, if the recalculated hash values of the talking head and the talking head show retrieved from the nodes of the distributed network match the hash values received from the blockchain.

14. The talking head digital identity immutable dual authentication method for use over a distributed network according to claim 13, wherein:

the unique bitmap stacks of the talking head and talking head show files comprise head bitmaps, lip bitmaps, and eye bitmaps.

15. The talking head digital identity immutable dual authentication method for use over a distributed network according to claim 14, wherein:

each head bitmap of the head bitmaps, each lip bitmap of the lip bitmaps, and each eye bitmap of the eye bitmaps are combined into a final head hash.

16. The talking head digital identity immutable dual authentication method for use over a distributed network according to claim 15, wherein:

the final head hash is stored on the blockchain with a smart contract transaction.

* * * * *